(12) United States Patent
Matsui et al.

(10) Patent No.: US 10,498,635 B2
(45) Date of Patent: Dec. 3, 2019

(54) ON-BOARD NETWORK SYSTEM

(71) Applicant: TOYOTA JIDOSHA KABUSHIKI KAISHA, Toyota-shi, Aichi-ken (JP)

(72) Inventors: Takeshi Matsui, Chofu (JP); Hisashi Furukawa, Nagakute (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 124 days.

(21) Appl. No.: 15/722,741

(22) Filed: Oct. 2, 2017

(65) Prior Publication Data
US 2018/0097721 A1   Apr. 5, 2018

(30) Foreign Application Priority Data

Oct. 4, 2016 (JP) ................................. 2016-196614
Dec. 9, 2016 (JP) ................................. 2016-239701

(51) Int. Cl.
*H04L 12/703* (2013.01)
*H04L 12/707* (2013.01)
*H04L 12/753* (2013.01)

(52) U.S. Cl.
CPC .............. *H04L 45/28* (2013.01); *H04L 45/22* (2013.01); *H04L 45/48* (2013.01)

(58) Field of Classification Search
CPC .......... H04L 45/28; H04L 45/48; H04L 45/22
USPC .................................................. 370/225, 256
See application file for complete search history.

(56) References Cited

U.S. PATENT DOCUMENTS

| 5,941,955 A * | 8/1999 | Wilby ................. H04Q 3/0029 709/242 |
| 9,419,854 B1 * | 8/2016 | Wang ...................... H04L 41/00 |
| 2004/0062209 A1 * | 4/2004 | Goldman ............... H04L 45/02 370/256 |
| 2005/0138008 A1 * | 6/2005 | Tsillas ..................... H04L 45/02 |
| 2011/0019535 A1 | 1/2011 | Nakashima et al. |
| 2017/0302756 A1 * | 10/2017 | Chou .................. H04L 67/2852 |

FOREIGN PATENT DOCUMENTS

| JP | 2000269967 A | 9/2000 |
| JP | 2006050079 A | 2/2006 |
| JP | 2006-333260 A | 12/2006 |
| JP | 2011029975 A | 2/2011 |

* cited by examiner

*Primary Examiner* — Kwang B Yao
*Assistant Examiner* — Syed M Bokhari
(74) *Attorney, Agent, or Firm* — Hunton Andrews Kurth LLP

(57) ABSTRACT

An on-board network system includes: communication lines; a plurality of nodes, each of the nodes being directly and physically connected to at least one of the other nodes by the communication lines, the nodes including loop nodes physically connected to a loop by the communication lines, the nodes constituting a first logical network in which the nodes are connected with each other via one route through the communication lines; a communication disruption detecting unit configured to detect disruption of communications via the communication lines; a network reconstruction unit configured to reconstruct a second logical network when the disruption of communications is detected by the communication disruption detecting unit, the second logical network not including a communication line that causes the disruption; and a delivery unit configured to deliver the information of the second logical network to the nodes.

6 Claims, 15 Drawing Sheets

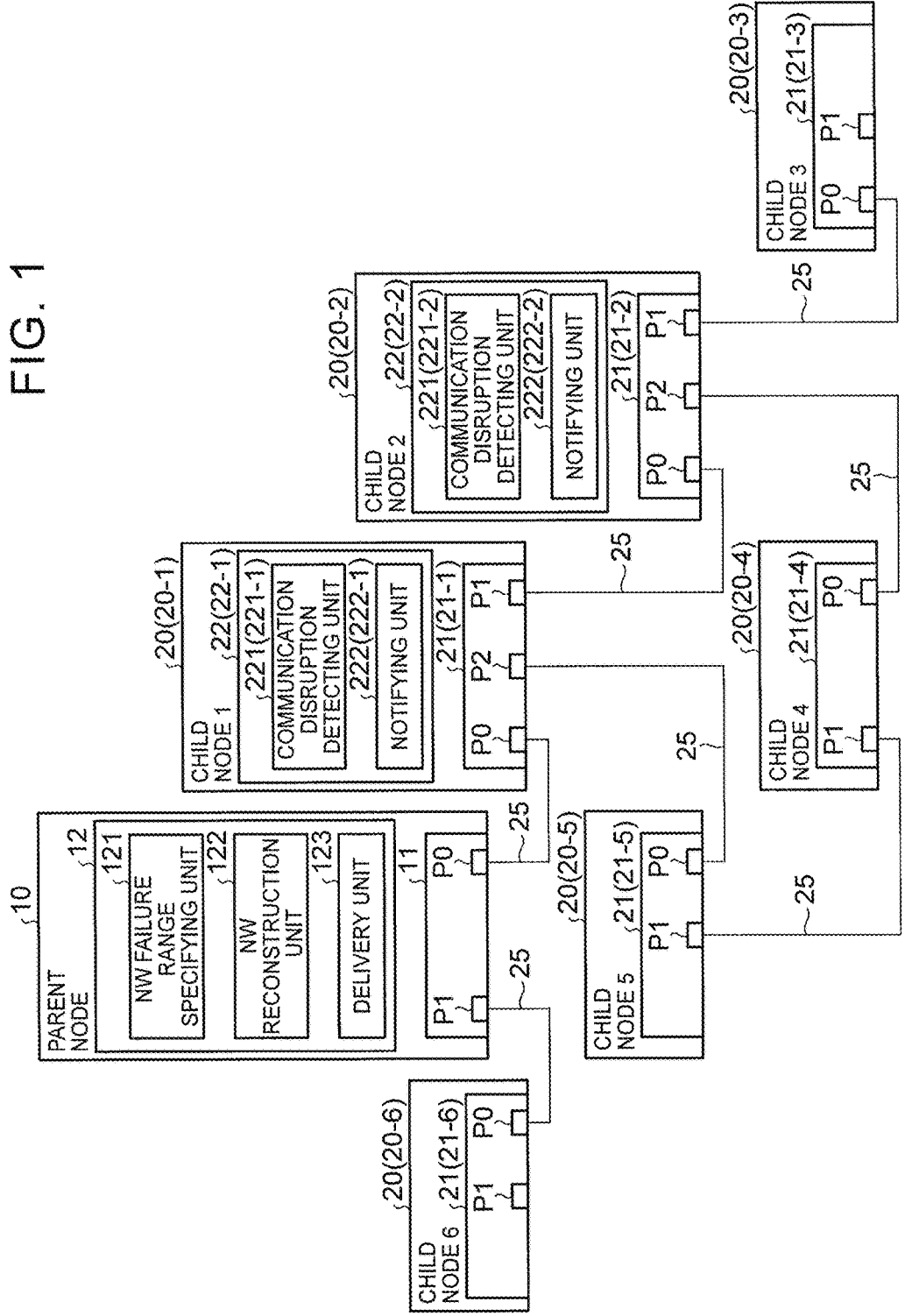

FIG. 3

| | MAC ADDRESS | PORT |
|---|---|---|
| PARENT NODE | 1 | P0 |
| | 2 | P0 |
| | 3 | P0 |
| | 4 | P0 |
| | 5 | P0 |
| | 6 | P1 |
| CHILD NODE 1 | 0 | P0 |
| | 2 | P1 |
| | 3 | P1 |
| | 4 | P1 |
| | 5 | P2 |
| | 6 | P0 |
| CHILD NODE 2 | 0 | P0 |
| | 1 | P0 |
| | 3 | P1 |
| | 4 | P2 |
| | 5 | P0 |
| | 6 | P0 |
| CHILD NODE 3 | 0 | P0 |
| | 1 | P0 |
| | 2 | P0 |
| | 4 | P0 |
| | 5 | P0 |
| | 6 | P0 |
| CHILD NODE 4 | 0 | P0 |
| | 1 | P0 |
| | 2 | P0 |
| | 3 | P0 |
| | 5 | P0 |
| | 6 | P0 |
| CHILD NODE 5 | 0 | P0 |
| | 1 | P0 |
| | 2 | P0 |
| | 3 | P0 |
| | 4 | P0 |
| | 6 | P0 |
| CHILD NODE 6 | 0 | P0 |
| | 1 | P0 |
| | 2 | P0 |
| | 3 | P0 |
| | 4 | P0 |
| | 5 | P0 |

FIG. 4
| NODE IDENTIFICATION INFORMATION | ROUTE INFORMATION |
|---|---|
| 0 | — |
| 1 | 0(P0)–(P0)1 |
| 2 | 0(P0)–(P0)1(P1)–(P0)2 |
| 3 | 0(P0)–(P0)1(P1)–(P0)2(P1)–(P0)3 |
| 4 | 0(P0)–(P0)1(P1)–(P0)2(P2)–(P0)4 |
| 5 | 0(P0)–(P0)1(P2)–(P0)5 |
| 6 | 0(P1)–(P0)1 |
FIG. 5A
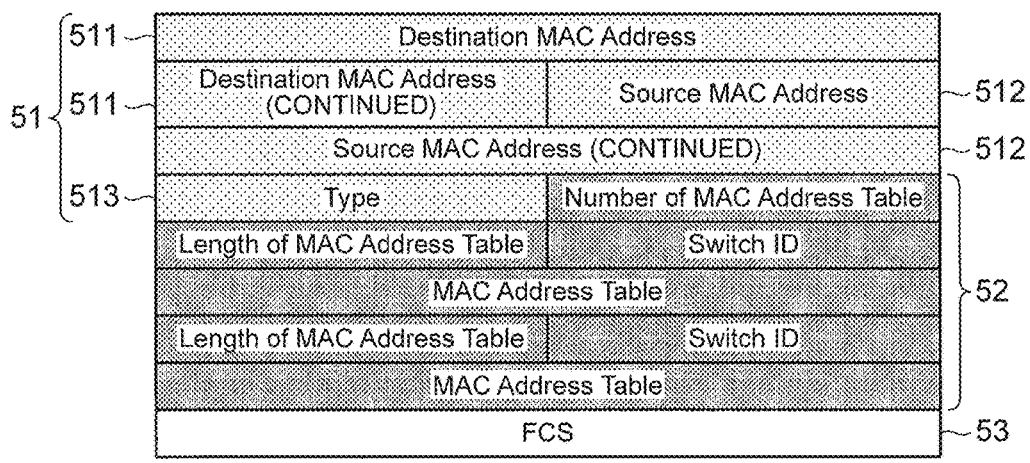
FIG. 5B
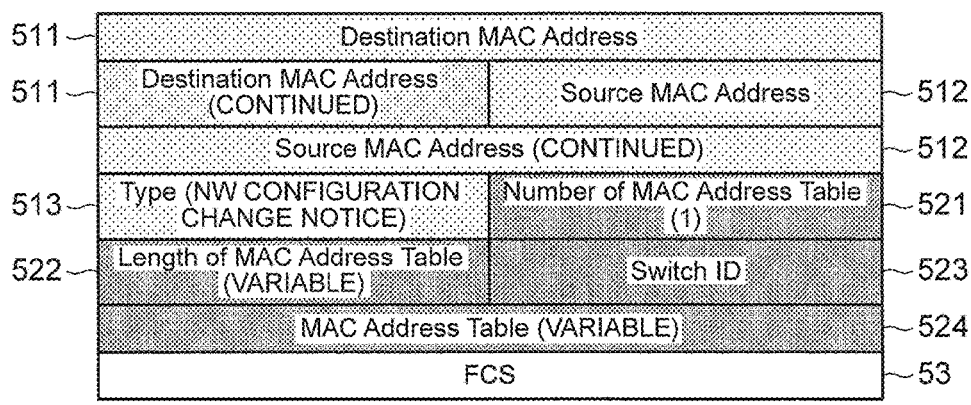

FIG. 5C

| | | |
|---|---|---|
| 511 — | Destination MAC Address (Broadcast . FF:FF:FF:FF:FF:FF) | |
| 511 — | Destination MAC Address (CONTINUED) | Source MAC Address — 512 |
| | Source MAC Address (CONTINUED) | — 512 |
| 513 — | Type (NW CONFIGURATION CHANGE NOTICE) | Number of MAC Address Table (6) — 521 |
| 522 — | Length of MAC Address Table (VARIABLE) | Switch ID (SWITCH OF CHILD NODE 1) — 523 |
| | MAC Address Table (VARIABLE) | — 524 |
| 522 — | Length of MAC Address Table (VARIABLE) | Switch ID (SWITCH OF CHILD NODE 2) — 523 |
| | MAC Address Table (VARIABLE) | — 524 |
| | ⋮ | |
| | FCS | — 53 |

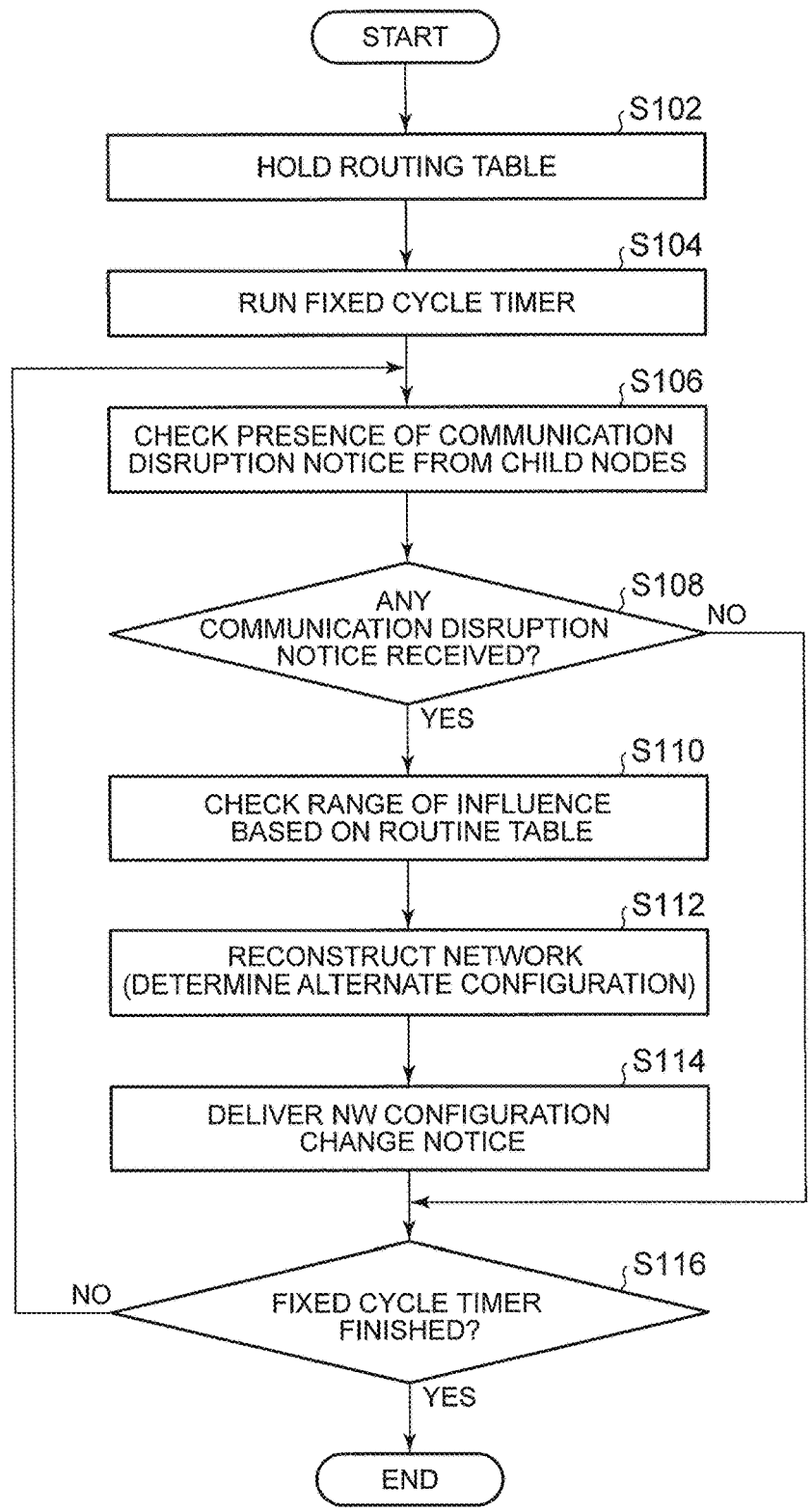

FIG. 7

| NODE IDENTIFICATION INFORMATION | ROUTE INFORMATION |
|---|---|
| 0 | — |
| 1 | 0(P0)–(P0)1 |
| 2 | 0(P0)–(P0)1(P2)–(P0)5(P1)–(P1)4(P0)–(P2)2 |
| 3 | 0(P0)–(P0)1(P2)–(P0)5(P1)–(P1)4(P0)–(P2)2(P1)–(P0)3 |
| 4 | 0(P0)–(P0)1(P2)–(P0)5(P1)–(P1)4 |
| 5 | 0(P0)–(P0)1(P2)–(P0)5 |
| 6 | 0(P1)–(P0)1 |

FIG. 8

| | MAC ADDRESS | PORT |
|---|---|---|
| PARENT NODE | 1 | P0 |
| | 2 | P0 |
| | 3 | P0 |
| | 4 | P0 |
| | 5 | P0 |
| | 6 | P1 |
| CHILD NODE 1 | 0 | P0 |
| | 2 | P2 |
| | 3 | P2 |
| | 4 | P2 |
| | 5 | P2 |
| | 6 | P0 |
| CHILD NODE 2 | 0 | P2 |
| | 1 | P2 |
| | 3 | P1 |
| | 4 | P2 |
| | 5 | P2 |
| | 6 | P2 |
| CHILD NODE 3 | 0 | P0 |
| | 1 | P0 |
| | 2 | P0 |
| | 4 | P0 |
| | 5 | P0 |
| | 6 | P0 |
| CHILD NODE 4 | 0 | P1 |
| | 1 | P1 |
| | 2 | P0 |
| | 3 | P0 |
| | 5 | P1 |
| | 6 | P1 |
| CHILD NODE 5 | 0 | P0 |
| | 1 | P0 |
| | 2 | P1 |
| | 3 | P1 |
| | 4 | P1 |
| | 6 | P0 |
| CHILD NODE 6 | 0 | P0 |
| | 1 | P0 |
| | 2 | P0 |
| | 3 | P0 |
| | 4 | P0 |
| | 5 | P0 |

FIG. 12

| SOURCE | DESTINATION | ROUTE | PRIORITY |
|---|---|---|---|
| GW1 (NODE 1) | GW2 (NODE 2) | GW1(P1) → (P1)GW2 | 1 |
| | | GW1(P2) → (P1)GW3(P2) → (P2)GW2 | 2 |
| GW1 (NODE 1) | GW3 (NODE 3) | GW1(P2) → (P1)GW3 | 1 |
| | | GW1(P1) → (P1)GW2(P2) → (P2)GW3 | 2 |
| GW2 (NODE 2) | GW3 (NODE 3) | GW2(P2) → (P2)GW3 | 1 |
| | | GW2(P1) → (P1)GW1(P2) → (P1)GW3 | 2 |

FIG. 13

| | ADDRESS | RELAY POINT (PORT) |
|---|---|---|
| GW1 | NODE 2(LN2) | GW2(P1) |
| | NODE 3(LN3) | GW3(P2) |
| GW2 | NODE 1(LN1) | GW1(P1) |
| | NODE 3(LN3) | GW3(P2) |
| GW3 | NODE 1(LN1) | GW1(P1) |
| | NODE 2(LN2) | GW2(P2) |

FIG. 14

|  | ADDRESS | RELAY POINT (PORT) |
|---|---|---|
| GW1 | NODE 2(LN2) | GW2(P1) |
|  | NODE 3(LN3) | GW3(P2) |
| GW2 | NODE 1(LN1) | GW1(P1) |
|  | NODE 3(LN3) | GW1(P1) |
| GW3 | NODE 1(LN1) | GW1(P1) |
|  | NODE 2(LN2) | GW1(P1) |

ON-BOARD NETWORK SYSTEM

INCORPORATION BY REFERENCE

The disclosures of Japanese Patent Application Nos. 2016-196614 and 2016-239701 filed Oct. 4, 2016 and Dec. 9, 2016, respectively, including the specifications, drawings and abstracts are incorporated herein by reference in their entireties.

BACKGROUND

1. Technical Field

The disclosure relates to an on-board network system.

2. Description of Related Art

A plurality of nodes on a network based on the Ethernet (registered trademark) communication protocol can obtain MAC addresses from each other, based on an IP address of other node, by use of Address Resolution Protocol (ARP) (for example, see. Japanese Patent Application Publication No. 2006-333260 (JP 2006-333260 A)). More specifically, if one node sends an APR request onto the network by broadcasting, and another node corresponding to a target IP address in the ARP request receives the ARP request, the other node sends an ARP reply including its own MAC address to the one node by unicasting. In this manner, the above-indicated one node can receive the ARP reply transmitted from the other node, and can obtain the MAC address of the other node. Also, when the one node is connected to a plurality of other nodes via a switch, it is possible to recognize network configuration (which port of the switch is ultimately connected to a communication node corresponding to each MAC address), by determining which port of the switch received the APR reply.

SUMMARY

In the meantime, if disconnection, or the like, occurs to a communication line that connects nodes on a network, the nodes cannot communicate with each other via the communication line. Therefore, on the physical network, a part of (two or more of) the plurality of nodes, or all of the nodes, on the network may be connected to a loop, to provide redundant configuration.

For example, a logical network (main network), which does not include one of a plurality of communication lines that connect a plurality of nodes (loop nodes) to a loop, is generally constructed, according to the Rapid Spanning Tree Protocol (RSTP). When disconnection, or the like, occurs to a communication line included in the main network, among the plurality of communication lines that connect the loop nodes with each other, an alternate network, which includes a communication line that is not included in the main network, among the plurality of communication lines that connect the loop nodes with each other, is reconstructed. Thus, even if communications cannot be conducted due to disconnection, or the like, the alternate network including the communication line that has been logically blocked is constructed, and therefore, communications can be restored by use of the alternate network. In this case, the above-indicated ARP, or the like, can be used, so that each node grasps which port of its switch leads to another node corresponding to each MAC address, on the reconstructed alternate network, and updates the MAC address table.

Also, on an Internet Protocol (IP) network on which a plurality of relay devices that belong to a plurality of local networks, respectively, are connected, for example, if one communication route cannot be used due to disconnection, an alternate communication route can be automatically reconstructed through exchange of information with other relay devices, by using a routing protocol, such as Routing Information Protocol (RIP).

However, if the ARP is used in the local network, it takes time to send and receive the ARP request and the ARP reply, and the network load may become considerably high, since each communication node transmits the ARP request by broadcasting. Also, in the case where RIP is used, on an upper-level network that connects two or more local networks, respective relay devices need to communicate with each other so as to regularly exchange information for reconstruction of the network. Therefore, it may take a relatively long time for each communication node to grasp the reconstructed network. On a vehicle-mounted or on-board network, in particular, communications are required to be immediately restored in real time, even in the event of disconnection, or the like. Thus, the requirement may not be satisfied, according to the method using ARP or RIP.

The disclosure provides an on-board network system capable of achieving communication restoration at an earlier opportunity, through reconstruction of a network, when communication disruption due to disconnection, or the like, occurs.

An aspect of the disclosure provides an on-board network system. The on-board network system according to the aspect of the disclosure includes: a plurality of communication lines; a plurality of nodes, each of the nodes being directly and physically connected to at least one of the other nodes by at least one of the plurality of communication lines, the plurality of nodes including a plurality of loop nodes physically connected to a loop by the plurality of communication lines, the plurality of nodes constituting a first logical network in which the nodes are connected with each other via one route through the communication lines, the plurality of nodes being configured to communicate with each other based on information concerning the configuration of the first logical network; a communication disruption detecting unit provided in a first node among the plurality of nodes, or in the plurality of loop nodes, and configured to detect disruption of communications via the communication lines that physically connect the plurality of loop nodes to the loop; a network reconstruction unit provided in the first node, and configured to reconstruct a second logical network, and create information concerning the configuration of the second logical network, when the disruption of communications is detected by the communication disruption detecting unit, the second logical network being configured such that the nodes are connected with each other via one route through the communication lines, without going through a communication line that causes the disruption; and a delivery unit provided in the first node, and configured to deliver the information concerning the configuration of the second logical network, which is created by the network reconstruction unit, to the plurality of nodes other than the first node.

According to the above aspect of the disclosure, if disruption of communications via the plurality of communication lines that physically connect the plurality of loop nodes is detected, the first node (network reconstruction unit) among the plurality of nodes reconstructs the second logical network in which the nodes are connected to each other only through one route that does not go through the communication line that causes the disruption, and creates information concerning the configuration of the second logical network. Then, the first node (delivery unit) delivers the created information concerning the configuration of the second logical network, to the nodes other than the first node. Accordingly, the plurality of nodes other than the first node can grasp the configuration of the second logical network thus reconstructed, and achieve restoration of communications, by receiving the information concerning the configuration of the second logical network, which is delivered from the first node. Therefore, signals are prevented from being transmitted and received between respective nodes connected to a network, as in the case where ARP or RIP is used, and the network load is prevented from being increased. Thus, restoration of communications can be achieved at an earlier opportunity.

In the on-board network system as described above, the plurality of nodes may include a parent node as the first node, and a plurality of child nodes physically connected by the communication lines in a hierarchical fashion, using the parent node as a source node. The plurality of nodes may constitute a logical tree-type network as the first logical network. The plurality of nodes may be configured to communicate with each other based on information concerning the configuration of the first logical network. The communication disruption detecting unit may be provided in a loop node at a higher level of hierarchy than a logically terminal loop node as seen from the parent node, among the plurality of loop nodes, or in the parent node, and may be configured to detect disruption of a communication via a first communication line included in the configuration of the first logical network, among the plurality of communication lines that physically connect the plurality of loop nodes to the loop. The network reconstruction unit may be provided in the parent node, the network reconstruction unit being configured to reconstruct the second logical network in a form of a logical tree-type network including a second communication line that is not included in the configuration of the first logical network, the second communication line being among the plurality of communication lines that physically connect the plurality of loop nodes to the loop, and to create information concerning a configuration of the second logical network, when the disruption of communications is detected by the communication disruption detecting unit. The delivery unit may be provided in the parent node, and may be configured to deliver the information concerning the configuration of the second logical network, which is created by the network reconstruction unit, to the plurality of childe nodes.

In the on-board network system as described above, the communication disruption detecting unit is provided for detecting disruption of communications via the communication line included in the first logical network, among the communication lines that physically connect the plurality of loop nodes to a loop, on the logical tree-type first logical network. More specifically, the communication disruption detecting unit is provided in the parent node, or the loop node(s) at the higher hierarchical level than the logically terminal loop node(s) as seen from the parent node, among the plurality of loop nodes. Therefore, disruption of communications via the communication line included in the first logical network, among the communication lines that physically connect the loop nodes to a loop, can be detected from the upper-level node (closer to the parent node on the first logical network) in the first logical network. Thus, the parent node can obtain information concerning disruption of communications via the communication line included in the first logical network, among the communication lines that connect the plurality of loop nodes with each other.

When disruption of communications via the communication lines that physically connect the plurality of loop nodes to a loop occurs, the parent node (network reconstruction unit) reconstructs the logical tree-type second logical network, which includes a communication line that is not included in the configuration of the first logical network, namely, has been logically blocked in the configuration of the first logical network, among the plurality of communication lines that physically connect the loop nodes to a loop. Then, the parent node (delivery unit) delivers information (for example, a MAC address table or a routing table) concerning the configuration of the second logical network thus reconstructed, to the child nodes. Accordingly, the child nodes can grasp the configuration of the reconstructed second logical network, by receiving the information concerning the configuration of the second logical network delivered from the parent node, and can achieve restoration of communications. Therefore, a large number of signals are prevented from being transmitted and received between respective nodes connected to the network, as in the case where the ARP is used, for example, and the network load is prevented from being increased due to broadcast transmission of the large number of signals: consequently, restoration of communications can be achieved at an earlier opportunity.

In the on-board network system as described above, the parent node may be a gateway device that relays communications with an external network.

With the above configuration, reconstruction of the local network can be managed by the gateway device.

In the on-board network system as described above, the network reconstruction unit may be configured to create route information indicating a route from the parent node to each of the plurality of child nodes, or destination information indicating a port of each of the plurality of child nodes to which each of the other nodes is connected as seen from said each of the plurality of child nodes.

With the above configuration, the child nodes can specifically start communications in the reconstructed second logical network, based on the route information or destination information delivered from the parent node.

In the on-board network system as described above, the delivery unit may be configured to deliver the information concerning the configuration of the second logical network created by the network reconstruction unit, to the plurality of child nodes, by broadcasting.

With the above configuration, the child nodes can grasp the configuration of the reconstructed second logical network, by receiving the information concerning the configuration of the second logical network delivered by broadcasting, so as to achieve restoration of communications.

In the on-board network system as described above, the delivery unit may be configured to deliver the information concerning the configuration of the second logical network created by the network reconstruction unit, to the plurality of child nodes, by unicasting.

With the above configuration, the child nodes can grasp the reconstructed network configuration, by receiving the information concerning the network configuration delivered by unicasting, so as to achieve restoration of communications.

In the on-board network system as described above, the plurality of nodes may comprise a plurality of gateway devices each of which belongs to one of a plurality of local networks, the plurality of gateway devices being configured to relay communications between the plurality of local networks.

With the above configuration, in an IP network that consists of a plurality of gateway devices that relay communications between a plurality of local networks, it is possible to achieve restoration of communications between the local networks at an earlier opportunity, without increasing the communication load, as in the case where RIP, or the like, is used.

In the on-board network system as described above, a degree of priority may be specified in advance for a plurality of physical communication routes between each pair of gateway devices among the plurality of gateway devices, and the first logical network may be logically constituted by communication routes having the highest priority. The network reconstruction unit may be configured to reconstruct the second logical network, by replacing a first communication route including the communication line that causes the disruption of communications, in the first logical network, with a second communication route having the highest priority, among the plurality of communication routes that do not include the communication line that causes the disruption of communications.

With the above configuration, when there are two or more physical communication routes between two gateway devices among the plurality of gateway devices, the priority is specified in advance for each of the communication routes. Therefore, when disruption of communications is detected, the communication route that does not include the communication line that causes disruption of communications is selected in order of priority, so that the second logical network can be easily reconstructed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a configuration diagram schematically showing one example of the configuration of an on-board network system according to a first embodiment;

FIG. 3 is a view showing a MAC address table corresponding to the main network;

FIG. 4 is a view showing a routing table corresponding to the main network;

FIG. 5A is a view showing the configuration of an Ethernet frame;

FIG. 5B is a view showing one example of Ethernet frame delivered from a parent node (delivery unit) to a child node;

FIG. 5C is a view showing another example of Ethernet frame delivered from the parent node (delivery unit) to the child node;

FIG. 6 is a flowchart schematically illustrating one example of control routine executed by the parent node;

FIG. 7 is a view showing a routing table corresponding to the alternate network;

FIG. 8 is a view showing a MAC address table corresponding to the alternate network;

FIG. 12 is a view showing one example of an overall management routing table;

FIG. 13 is a view showing one example of a routing table according to a main network;

FIG. 14 is a view showing one example of a routing table according to an alternate network;

DETAILED DESCRIPTION OF EMBODIMENTS

Some embodiments of the disclosure will be described with reference to the drawings.

In the embodiments (first embodiment, second embodiment) as described below, an on-board network system in which a plurality of nodes that are physically connected by a plurality of communication lines, such that they can communicate with each other, constitute a logical network on which mutual communications are conducted via only one route through the communication lines, will be illustrated by way of example. Each of the nodes are directly connected to at least one of the other nodes by the communication lines, and the nodes include a plurality of loop nodes physically connected to a loop by the communication lines. In the network system, mutual communications are conducted based on information concerning the configuration of the network.

First Embodiment

An on-board network system 1 according to the first embodiment includes a parent node 10, and a plurality of child nodes 20 physically connected by communication lines 25 in a hierarchical fashion, using the parent node 10 as a source node, as a plurality of nodes of which each pair of nodes are physically connected by a single communication line, such that they can communicate with each other, as will be described later. In the on-board network system 1, the parent node 10 and the plurality of child nodes 20 constitute a logical tree-type network having the parent node 10 as a source node, and mutual communications are conducted based on information (such as a MAC address table or a routing table, which will be described later) concerning the configuration of the network.

Figure 2A:
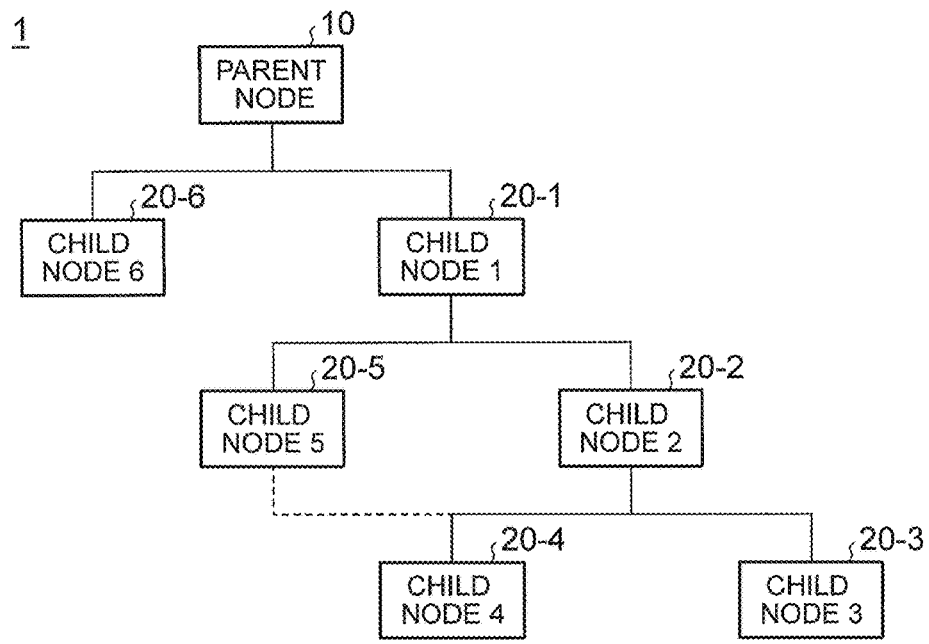
FIG. 2A is a view showing one example (configuration of a main network) of the configuration of a logical network.
Figure 2B:
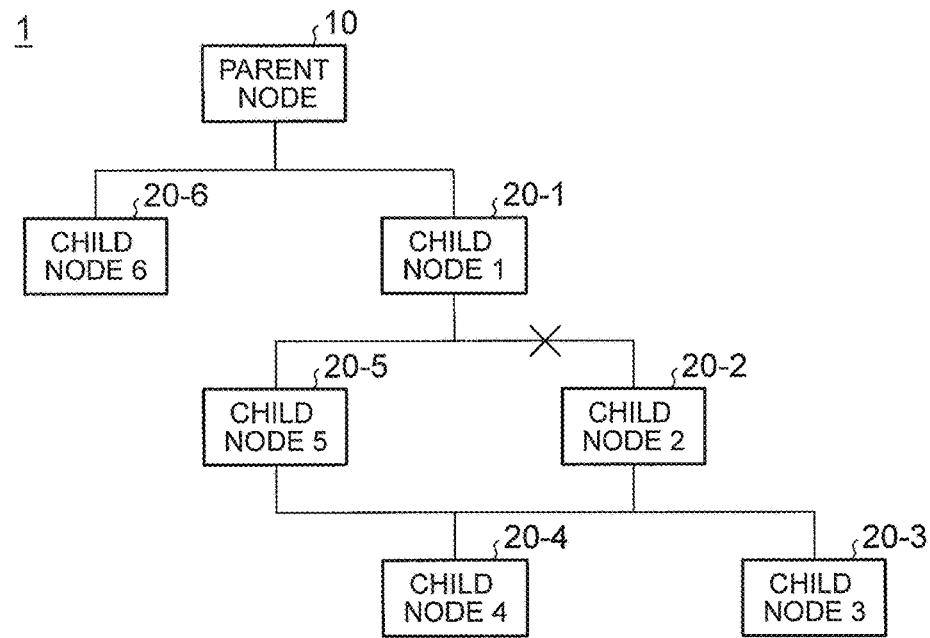
FIG. 2B is a view showing another example (configuration of an alternate network) of the configuration of a logical network.

Referring initially to FIG. 1, FIG. 2A, and FIG. 2B, the configuration of the on-board network system 1 according to this embodiment will be described.

FIG. 1 is a block diagram schematically showing one example of the configuration of the on-board network system 1. In the on-board network system 1, a plurality of communication nodes (parent node 10, child nodes 20) communicate with each other, based on the Ethernet communication protocol. The on-board network system 1 includes the parent node 10, and the plurality of child nodes 20, namely, child node 1 to child node 6 (child nodes 20-1 to 20-6), and the parent node 10 and the child nodes 20 are hierarchically connected via communication lines 25.

The on-board network system 1 will be described from the standpoint of a physical network. The on-board network system 1 includes one parent node 10 (root node), and a plurality of child nodes 20 (child nodes 20-1 to 20-6) physically connected by communication lines 25 in a hierarchical fashion, using the parent node 10 as a point of origin. The parent node 10 as the root node located at the top hierarchy level (first hierarchy level) of the network is connected to the child node 20-1 and child node 20-6 at a hierarchy level (second hierarchy level) located one level below the top (first) hierarchy level, via respective communication lines 25. Also, the child node 20-1 at the second hierarchy level is connected to the child node 20-2 and child node 20-5 at a hierarchy level (third hierarchy level) located one level below the second hierarchy level, via respective communication lines 25. Also, the child node 20-2 at the third hierarchy level is connected to the child node 20-3 and child node 20-4 at a hierarchy level (fourth hierarchy level) located one level below the third hierarchy level, via respective communication lines 25. Also, the child node 20-5 at the third hierarchy level is connected to the child node 20-4 as a communication node at the level (fourth hierarchy level) located one level below the third hierarchy level. Namely, the child node 20-4 is physically connected with two higher-level nodes (child nodes 20-2, 20-5). Therefore, the child nodes 20-1, 20-2, 20-4, 20-5 are connected to a loop. The child node 20-6 at the second hierarchy level and the child nodes 20-3, 20-4 at the fourth hierarchy level are not connected to other nodes at the lower hierarchy levels.

The on-board network system 1 will be described from the standpoint of a logical network. In the on-board network system 1, the parent node 10 and the plurality of child nodes 20 (child nodes 20-1 to 20-6) constitute a logical tree-type network. The tree-type network is a network in which there is only one communication route between the root node (parent node 10) and each of the child nodes (childe nodes 20-1 to 20-6). Then, the parent node 10 and the child nodes 20-1 to 20-6 communicate with each other, based on information (e.g., a routing table, MAC address table, etc., which will be described later) concerning the configuration of the logical network. Referring next to FIG. 2A and FIG. 2B, the configuration of the logical network in the on-board network system will be described.

FIG. 2A and FIG. 2B show the configuration of the logical network in the on-board network system 1. More specifically, FIG. 2A shows the configuration of one example of logical network (which will be called "main network" (one example of first logical network)) pertaining to the on-board network system 1. FIG. 2B shows the configuration of another example of logical network (which will be called "alternate network" (one example of second logical network)) pertaining to the on-board network system 1.

As described above, the child nodes 20-1, 20-2, 20-4, and 20-5 are physically connected to a loop (redundant connection), and are configured to be able to communicate with each other, through two routes. Therefore, in the main network, a connection channel (dotted line in FIG. 2A) between the child node 20-5 and the child node 20-4 is set to a blocked state, as shown in FIG. 2A, by use of the algorithm of RSTP. More specifically, a port P1 of a switch 21-5 of the child node 20-5 or a port P1 of a switch 21-4 of the child node 20-4 is set as a block port. In this manner, a broadcast storm can be avoided, and a logical tree-type network topology (main network) can be constructed.

In the meantime, if communication disruption (a communication failure that disables communications via the communication line 25 concerned), such as disconnection, occurs to any of the communication lines 25 included in the configuration of the main network, among the communication lines 25 that physically connect the child nodes 20-1, 20-2, 20-4, 20-5 to a loop, communications via the communication line 25 to which disconnection, or the like, has occurred cannot be conducted. Therefore, by using the algorithm of RSTP, a redundantly connected portion in the blocked state, namely, the connection channel (communication line 25) between the child node 20-5 and the child node 20-4, is changed in setting into an active state in which logical communications are feasible. More specifically, the port of the child node 20-5 or child node 20-4, which has been set in the blocked state, is set to a forwarding state. As a result, a logical tree-type alternate network is constructed which includes a communication line 25 that is not included in the configuration of the main network, among the communication lines 25 that physically connect the child nodes 20-1, 20-2, 20-4 and 20-5 to a loop, and communications via the child nodes 20-1, 20-2, 20-4, and 20-5 can be restored. For example, if the construction (see FIG. 2A) of the main network is assumed, and communication disruption (as indicated by "X" in FIG. 2B) due to disconnection, or the like, occurs to the connection channel between the child node 20-1 and the child node 20-2, the parent node 10, child node 20-1, etc. will not be able to communicate with the child nodes 20-2, 20-4. Therefore, the connection channel (communication line 25) between the child node 20-5 and the child node 20-4 is changed in setting from the blocked state to the active state, so that the parent node 10, child node 20-1, etc. can communicate with the child nodes 20-2, 20-4, via a communication route that goes through the child node 20-5.

The logical tree-type alternate network naturally does not include the communication line 25 which is included in the configuration of the main network and to which the communication disruption has occurred, among the communication lines 25 that physically connect the child nodes 20-1, 20-2, 20-4, 20-5 to a loop.

In the case where communication disruption due to disconnection, or the like, occurs to a connection channel between the child node 20-1 and the child node 20-5, or a connection channel between the child node 20-2 and the child node 20-4, too, the connection channel between the child node 20-5 and the child node 20-4 is similarly changed in setting from the blocked state to the active state.

Generally, the algorithm of RSTP is executed by a root bridge (e.g., a switch 21-1 of the child node 20-1), based on sending and receiving of BPDU (Bridge Protocol Data Unit) between switches 21 (switches 21-1, 21-2, 21-4, 21-5) included in the respective child nodes 20-1, 20-2, 20-4, 20-5 connected to a loop. On the other hand, in this embodiment, the management function concerning the configuration of the logical network is concentrated on the parent node 10. Namely, the parent node 10 monitors communication disruption (communication failure) of any communication line 25 included in the main network, among the communication lines 25 that connect the child nodes 20-1, 20-2, 20-4, 20-5 to a loop. Then, if any communication disruption is detected, the parent node 10 performs processing corresponding to RSTP, and changes the connection channel between the child node 20-5 and the child node 20-4 from the blocked state to the active state. The processing performed by the parent node 10 will be described in detail later.

Referring back to FIG. 1, the parent node 10 is, for example, a gateway device (gateway ECU), or the like, which relays communications with various Electronic Control Units (ECUs) installed on the vehicle, and an external network, as the top-level node of network. In the on-board network system 1, the parent node 10 has the function of managing the configuration of the logical network, as described above. The parent node 10 holds information (physical configuration information) concerning the configuration of the physical network, in an internal memory, such as Electrically Erasable Programmable Read Only Memory (EEPROM). When a communication failure occurs, the parent node 10 changes the logical configuration of the network, based on the physical configuration information, and information (logical configuration information) concerning the current configuration of the logical network, so as to perform processing for restoring communications. The parent node 10 includes a switch 11 and a microcomputer 12.

The switch 11 is a network device that includes two or more ports (ports P0, P1), and has a switching function of connecting the parent node 10 with two or more nodes, through the communication lines 25 connected to the respective ports. The child node 20-1 (switch 21-1) is connected to the port P0 of the switch 11 via the communication line 25, and the child node 20-6 (switch 21-6) is connected to the port P1 of the switch 11 via the communication line 25. The switch 11 stores MAC addresses of other nodes (the childe nodes 20-1 to 20-6) connected through respective ports, as a MAC address table shown in FIG. 3, for example. The MAC address table will be further explained, referring to FIG. 3.

For example, as shown in FIG. 3, in the MAC address table corresponding to the switch 11 of the parent node 10, MAC addresses "1" to "6" corresponding to the respective child nodes 20-1 to 20-6 are associated with the port numbers. More specifically, in the configuration of the main network, the child nodes 20-1 to 20-5 are connected ultimately to the port P0 of the switch 11, and the child node 20-6 is connected to the port P1 of the switch 11. The switch 11 transmits a communication frame (Ethernet frame), only from the port to which the node corresponding to the MAC address of a destination included in a head portion of the communication frame (Ethernet frame) transmitted by the parent node 10 is connected, based on the MAC address table.

Referring back to FIG. 1, the microcomputer 12 includes CPU, RAM, ROM, I/O, etc., and performs various functions by executing various programs stored in the ROM, on the CPU. The microcomputer 12 includes a network failure range specifying unit (NW failure range specifying unit) 121, a network reconstruction unit (NW reconstruction unit) 122, and a delivery unit 123, as functional units.

The functions of the NW failure range specifying unit 121, NW reconstruction unit 122, and the delivery unit 123 may also be implemented by any hardware, software, or a combination thereof, instead of the microcomputer 22.

The NW failure range specifying unit 121 specifies the range of a communication failure (network failure) of the network, based on information (communication disruption information) concerning communication disruption included in a communication disruption notice received from the child node 20-1, 20-2. For example, the NW failure range specifying unit 121 grasps which one of the communication lines 25 included in the configuration of the current logical network (main network), among the communication lines 25 that connect the child nodes 20-1, 20-2, 20-4, 20-5 to a loop, to which communication disruption occurs, based on logical configuration information (e.g., a routing table), and communication disruption information (e.g., the number of the port in a link-down state). Then, the NW failure range specifying unit 121 specifies the child node 20 that is in a condition where its communications with the parent node 10 are disrupted. For example, assuming the configuration of the main network, if disconnection, or the like, occurs to the connection channel between the child node 20-1 and the child node 20-2, and the NW failure range specifying unit 121 receives a communication disruption notice from the child node 20-1 that detected the communication disruption of the connection channel between the childe node 20-1 and the child node 20-2, it checks a routing table corresponding to the main network shown in FIG. 4. Referring to FIG. 4, the routing table will be further described.

In FIG. 4, "0" in the column of node identification information corresponds to the parent node 10, and "1" to "6" in the column of node identification information correspond to the child nodes 20-1 to 20-6, respectively. Also, "1" to "6" in the column of route information correspond to the child nodes 20-1 to 20-6, respectively, as in the case of the node identification information, and "P0" or "P1" in parentheses represents the port number of the switch (switch 11, switch 21) of each node.

As shown in FIG. 4, the routing table consists of node identification information of each node (each of the parent node 10 and the child nodes 20), and route information indicating a communication route from the parent node 10 to each node (child node 20) corresponding to the node identification information. By checking the routing table, the NW failure range specifying unit 121 can specify the child nodes 20-2 to 20-4 (node identification information "2" to "4") that communicate with the parent node 10, via the connection channel between the child node 20-1 and the child node 20-2 in which disconnection, or the like, occurs.

Referring back to FIG. 1, the NW reconstruction unit 122 reconstructs the network so as to restore communications between the parent node 10 and the child nodes 20 in communication disruption conditions, based on the range of the network failure specified by the NW failure range specifying unit 121. For example, the NW reconstruction unit 122 performs processing corresponding to RSTP, as described above, and determines the configuration of a logical network (alternate network) for connecting the parent node 10 with the child nodes 20 in communication disruption conditions, so that the parent node 10 can communicate with the child nodes 20. As described above, the child nodes 20-1, 20-2, 20-4, 20-5 are physically connected to a loop, and in the configuration of the main network, the connection channel between the child node 20-5 and the child node 20-4 is logically set in the blocked state. Therefore, when disconnection, or the like, occurs to any of the communication lines 25 included in the configuration of the main network, among the communication line 25 that physically connect the child nodes 20-1, 20-2, 20-4, 20-5 to a loop, the NW reconstruction unit 122 places the connection channel between the childe node 20-5 and the child node 20-4 in the active state, and reconstructs the network. Namely, the NW reconstruction unit 122 reconstructs the logical tree-type alternate network, which includes a communication line 25 that is not included in the configuration of the main network, among the communication lines 25 that connect the child nodes 20-1, 20-2, 20-4, 20-5 to a loop, as described above. The NW reconstruction unit 122 updates the routing table stored in the internal memory, or the like, into a form corresponding to the configuration of the reconstructed logical network (alternate network). Also, the NW reconstruction unit 122 creates a MAC address table of the child nodes 20-1 to 20-6 (switches 21-1 to 21-6) corresponding to the configuration of the reconstructed logical network (alternate network).

The delivery unit 123 delivers a network configuration change notice (NW configuration change notice) including the MAC address table created by the NW reconstruction unit 122, to the child nodes 20-1 to 20-6. For example, the delivery unit 123 may deliver the NW configuration change notice to the child nodes 20-1 to 20-6 by unicasting. The delivery unit 123 may also deliver the NW configuration change notice to the childe nodes 20-1 to 20-6 by broadcasting. Referring next to FIG. 5A-FIG. 5C, a communication frame used for delivering the MAC address table will be described.

FIG. 5A to FIG. 5C show communication frames (Ethernet frames) used for delivering MAC address tables. More specifically, FIG. 5A shows the configuration of an Ethernet frame, and FIG. 5B shows one example of Ethernet frame used for delivering the MAC address table, while FIG. 5C shows another example of Ethernet frame used for delivering the MAC address table.

In FIG. 5A to FIG. 5C, the content of each Ethernet frame is indicated such that it turns back every four bytes.

As shown in FIG. 5A, the Ethernet frame includes a 14-byte header portion 51, a data portion 52 of a variable number of bytes (46 bytes to 1500 bytes), and a four-byte FCS (Frame Check Sequence) 53 as an error-correcting code.

The header portion 51 includes a six-byte destination MAC address 511, six-byte source MAC address 512, and a two-byte frame type 513. The frame type 513 is identification information (identification value) with which the content of the Ethernet frame can be determined at the destination, and is specified in advance.

When the delivery unit 123 delivers the MAC address table by unicasting, for example, the MAC address of any one of the child nodes 20-1 to 20-6 is set as the destination MAC address 511 of the header portion 51 of the Ethernet frame concerning the NW configuration change notice. Also, an identification value indicating that the Ethernet frame pertains to the NW configuration change notice is set as the frame type of the header portion 51.

As shown in FIG. 5B, the data portion 52 of the Ethernet frame concerning the NW configuration change notice includes the number of MAC address tables 521, data size 522 of the MAC address table(s), identification information (switch ID) 523 of the switch 21 (switch 21-1 to 21-6 which will be described later) included in the child node 20 (any of the child nodes 20-1 to 20-6) of the destination, and MAC address table data 524. Since this example shows the case of unicast delivery, "1" is set to the number of MAC address table(s) 521, and the actual size (length) is set to the data size 522 of the MAC address table. Also, a value (for example, any of "1" to "6") corresponding to any of the child nodes 20 (child nodes 20-1 to 20-6) of the destination is set to the switch ID 523, and data of the MAC address table created by the NW reconstruction unit 122 is stored in the MAC address table data 524.

In this case, the delivery unit 123 creates an Ethernet frame concerning the NW configuration change notice, for each destination, and transmits it to each destination via the switch 11.

In this connection, the delivery unit 123 need not deliver the NW configuration change notice, to the child node(s) 20 (switch(es) 21) for which no change is made on the MAC address table. Also, the delivery unit 123 preferably delivers the MAC address table to the child node 20 of the higher hierarchical level first, and then to that of the lower level. In this case, when the MAC address table is delivered by unicasting to the child node 20 of the lower hierarchical level, the MAC address table of the child node 20 of the higher hierarchical level is already updated, and therefore, the NW configuration change notice can be appropriately transferred to the lower-level child node 20. Also, the Ethernet frame concerning the NW configuration change notice is set such that it can also be received by the port in the blocked state. Thus, even if the port P1 of the child node 20-4 is set in the blocked state, the child node 20-4 can receive the NW configuration change notice transferred from the child node 20-5.

When the delivery unit 123 delivers the MAC address table by broadcasting, for example, "FF:FF:FF:FF:FF:FF" indicating broadcast delivery is designated, in the destination MAC address 511 of the header portion 51 of the Ethernet frame concerning the NW configuration change notice, as shown in FIG. 5C. Also, an identification value indicating that the Ethernet frame pertains to the NW configuration change notice is set to the frame type 513 of the header portion 51, as in the case of the unicast delivery (see FIG. 5B).

As shown in FIG. 5C, the number of destinations, namely, the number ("6") of the child nodes 20, is set to the number of the MAC address tables 521 in the data portion 52 of the Ethernet frame concerning the NW configuration change notice. Since a plurality of (six) MAC address tables are stored in the data portion 52 of the Ethernet frame associated with the NW configuration change notice, a plurality of (six) combinations of the data size 522, switch ID 523, and the MAC address table data 524 are set. More specifically, the data size 522, switch ID 523, and MAC address table data 524 corresponding to the child node 20-1 are initially set, and then, the data size 522, switch ID 523, and MAC address table data 524 corresponding to the child node 20-2 are set. In this manner, the data size 522, switch ID 523, and MAC address table data 524 corresponding to each of the six child nodes 20-1 to 20-6 are sequentially set.

In this case, the delivery unit 123 creates only one NW configuration change notice, and delivers it to all of the child nodes 20 (child nodes 20-1 to 20-6) on the network by broadcasting.

Even when the NW configuration change notice is delivered by broadcasting, the MAC address table that is not changed need not be stored in the data portion 52 of the Ethernet frame concerning the NW configuration change notice. As will be described later, each of the child nodes 20-1 to 20-6 is adapted to recognize the MAC address table data 524 of the switch 21-1-21-6 included in itself, based on the switch ID 523 of the data portion 52, and, if there is no switch ID 523 corresponding to the child node in question, the MAC address table is not updated. Also, when the NW configuration change notice is delivered by broadcasting, the MAC address table is updated from the child node 20 of the higher hierarchical level, as in the case of unicast delivery. Namely, if the child node 20-1 receives the NW configuration change notice delivered by broadcasting, it updates the MAC address table of the switch 21-1, and the switch 21-1 transfers the NW configuration change notice to the child node 20-5 (switch 21-5) after the updating is completed. Also, when the NW configuration change notice is delivered by broadcasting, the Ethernet frame concerning the NW configuration change notice is set such that it can be received by the port in the blocked state, as in the case of unicast delivery.

Referring back to FIG. 1, the child nodes 20-1, 20-2 are various ECUs installed on the vehicle, for example. The child nodes 20-1, 20-2 are nodes (intermediate nodes) located at an intermediate level in the logical network that is hierarchically constructed, and have a function of connecting adjacent upper-level node and lower-level node via the communication lines 25. More specifically, in the first network, the child nodes 20-1, 20-2 are at the upper levels of hierarchy than the logically terminal child nodes 20-4, 20-5 as seen from the parent node 10, among the child nodes 20-1, 20-2, 20-4, 20-5 physically connected to a loop. Each of the child nodes 20-1, 20-2 includes a switch 21 (switch 21-1, 21-2) and a microcomputer 22 (microcomputer 22-1, 22-2).

Like the switch 11, the switch 21-1, 21-2 is a network device that includes two or more ports (ports P0 to P2), and has a switching function of connecting the corresponding node 20-1, 20-2 with two or more nodes, through the communication lines 25 connected to the respective ports. The parent node 10 (switch 11) is connected to a port P0 of the switch 21-1, and the child node 20-2 (switch 21-2) is connected to a port P1 of the switch 21-1, while the child node 20-5 (switch 21-5) is connected to a port P2 of the switch 21-1. Also, the child node 20-1 (switch 21-1) is connected to a port P0 of the switch 21-2, and the child node 20-3 (switch 21-3) is connected to a port P1 of the switch 21-2, while the child node 20-4 (switch 21-4) is connected to a port P2 of the switch 21-2. Like the switch 11, each of the switches 21-1, 21-2 stores MAC addresses of the other nodes to which the switch is connected through respective ports, as a MAC address table, for example.

For example, as shown in FIG. 3, in the MAC address table corresponding to the switch 21-1 of the child node 20-1, "0", and "2" to "6" as MAC addresses corresponding to the parent node 10, and the child nodes 20-2 to 20-6, respectively, are associated with the port numbers. More specifically, in the configuration of the main network, the parent node 10 and the child node 20-6 are ultimately connected to the port P0 of the switch 21-1, and the child nodes 20-2 to 20-4 are ultimately connected to the port P1 of the switch 21-1, while the child node 20-5 is connected to the port P2 of the switch 21-1, as indicated in FIG. 3.

Also, as shown in FIG. 3, in the MAC address table corresponding to the switch 21-2 of the child node 20-2, "0", "1", and "3" to "6" as MAC addresses corresponding to the parent node 10, and the child nodes 20-1, 20-3 to 20-6, respectively, are associated with the port numbers. More specifically, in the configuration of the main network, the parent node 10 and the child nodes 20-1, 20-5, 20-6 are ultimately connected to the port P0 of the switch 21-2, and the child node 20-3 is connected to the port P1 of the switch 21-2, while the child node 20-4 is connected to the port P2 of the switch 21-2.

Each of the switches 21-1, 21-2 sends a communication frame (Ethernet frame) transmitted by a corresponding one of the child nodes 20-1, 20-2, only from the port connected to the node corresponding to the MAC address of the destination included in the head portion of the communication frame, based on the MAC address table.

Like the microcomputer 12, the microcomputer 22 (22-1, 22-2) includes CPU, RAM, ROM, I/O, etc., and implements various functions by executing various programs stored in the ROM, on the CPU. Each of the microcomputers 22-1, 22-2 includes a communication disruption detecting unit 221 (communication disruption detecting unit 222-1, 222-2), and a notifying unit 222 (notifying unit 222-1, 222-2), as functional units.

The functions of the communication disruption detecting unit 221 (communication disruption detecting unit 221-1, 221-1) and the notifying unit 222 (notifying unit 222-1, 222-2) may be implemented by any hardware, software, or a combination thereof, in place of the microcomputer 22.

The communication disruption detecting unit 221-1, 221-2 detects disruption of communications via a communication line 25 included in the main network, among the communication lines 25 that physically connect the child nodes 20-1, 20-2, 20-4, 20-5 to a loop. More specifically, the communication disruption detecting unit 221-1, 221-2 detects a communication disruption condition of a connection channel (communication line 25) between the corresponding child node 20-1, 20-2, and an adjacent lower-level node (the child node 20-2, 20-5 for the child node 20-1, or the child node 20-4 for the child node 20-2). For example, each of the communication disruption detecting units 221-1, 221-2 cyclically monitors a receiving condition in which a communication frame (Ethernet frame) and a link pulse signal are received within a given time, at each port (the port P1, P2 of the switch 21-1, or the port P2 of the switch 21-2) of the switch 21-1, 21-2 to which the adjacent lower-level node is connected. If both of the communication frame and the link pulse signal are not received at at least one of the respective ports in question of the switches 21-1, 21-2, within the above-indicated given time, the communication disruption detecting unit 221-1, 221-2 determines that the port at which both of the communication frame and the link pulse signal were not received is in a link down (communication disruption) condition. Then, the communication disruption detecting unit 221-1, 221-2 creates communication disruption information including the number of the port in the link down condition.

The communication disruption detecting unit 221-2 may also detect disruption of communications via a communication line 25 other than the communication lines 25 that physically connect the child nodes 20-1, 20-2, 20-4, 20-5 to a loop, namely, a connection channel (communication line 25) between the child node 20-2 and the child node 20-3.

When each of the communication disruption detecting units 221-1, 221-2 detects disruption of communications with another node, and creates communication disruption information, the corresponding notifying unit 222-1, 222-2 sends a communication disruption notice including the communication disruption information concerning the detected communication disruption, to the parent node 10. In the first network, the child nodes 20-1, 20-2 are at the upper levels of hierarchy than the logically terminal child nodes 20-4, 20-5 as seen from the parent node 10, among the child nodes 20-1, 20-2, 20-4, 20-5 physically connected to a loop, as described above. Therefore, disruption of communications via the communication line 25 included in the main network, among the communication lines 25 that physically connect the child nodes 20-1, 20-2, 20-4, 20-5 to a loop, can be detected from the upper-level node (closer to the parent node 10 on the main network) in the main network. Thus, the root node can obtain the communication disruption information from the child nodes 20-1, 20-2 (the notifying units 222-1, 222-2).

The child nodes 20-3 to 20-6 are various ECUs, sensors, actuators, or the like, installed on the vehicle, for example. The child nodes 20-3 to 20-6 are terminal nodes in the logical network (main network) that is hierarchically constructed. Each of the child nodes 20-3 to 20-6 includes a switch 21 (a corresponding one of the switches 21-3 to 21-6).

In the main network, the child nodes 20-4, 20-5 are terminal nodes having no relaying function. However, in the alternate network as described above, the connection channel between the child node 20-4 and the child node 20-5 is set to the active state, and therefore, the child nodes 20-4, 20-5 function as intermediate nodes.

Each of the switches 21-3 to 21-6 is a network device that includes two or more ports (P0, P1), and has a switching function of connecting the corresponding child node with two or more communication nodes, through the communication lines 25 connected to the respective ports. The child node 20-2 (switch 21-2) is connected to a port P0 of the switch 21-3. The child node 20-2 (switch 21-2) is also connected to a port P0 of the switch 21-4, and the child node 20-5 (switch 21-5) is connected to a port P1 of the switch 21-4. Also, the child node 20-1 (switch 21-1) is connected to a port P0 of the switch 21-5, and the child node 20-4 (switch 21-4) is connected to a port P1 of the switch 21-5. Like the switch 11, etc., each of the switches 21-3 to 21-6 stores the MAC addresses of other nodes to which the corresponding child node is connected via the respective ports, as a MAC address table, for example.

The ports P1 of the switches 21-3, 21-6 are not used.

For example, as shown in FIG. 3, in the MAC address table corresponding to the switch 21-3 of the child node 20-3, "0", "1", "2", and "4" to "6" as MAC addresses corresponding to the parent node 10, and the child nodes 20-1, 20-2, 20-4 to 20-6, respectively, are associated with the port number. More specifically, in the configuration of the main network, the parent node 10, and the child nodes 20-1, 20-2, 20-4 to 20-6 are ultimately connected to the port P0 of the switch 21-3.

Also, as shown in FIG. 3 by way of example, in the MAC address table corresponding to the switch 21-4 of the child node 20-4, "0", "1" to "3", "5", and "6" as MAC addresses corresponding to the parent node 10, and the child nodes 20-1 to 20-3, 20-5, and 20-6, respectively, are associated with the port number. More specifically, in the configuration of the main network, the parent node 10, and the child nodes 20-1 to 20-3, 20-5, and 20-6 are ultimately connected to the port P0 of the switch 21-4, as indicated in FIG. 3.

Also, as shown in FIG. 3 by way of example, in the MAC address table corresponding to the switch 21-5 of the child node 20-5, "0", "1" to "4", and "6" as MAC addresses corresponding to the parent node 10, and the child nodes 20-1 to 20-4, and 20-6, respectively, are associated with the port number. More specifically, in the configuration of the main network, the parent node 10, and the child nodes 20-1 to 20-4, and 20-6 are ultimately connected to the port P0 of the switch 21-5, as indicated in FIG. 3.

Also, as shown in FIG. 3 by way of example, in the MAC address table corresponding to the switch 21-6 of the child node 20-6, "0", and "1" to "5" as MAC addresses corresponding to the parent node 10, and the child nodes 20-1 to 20-5, respectively, are associated with the port number. More specifically, in the configuration of the main network, the parent node 10, and the child nodes 20-1 to 20-5 are ultimately connected to the port P0 of the switch 21-6, as indicated in FIG. 3.

Each of the switches 21-3 to 21-6 sends a communication frame (Ethernet frame) transmitted by a corresponding one of the child nodes 20-3 to 20-6, only from the port connected to the node corresponding to the MAC address of the destination included in the head portion of the communication frame, based on the MAC address table.

Referring next to FIG. 6, a control flow or routine executed by the parent node 10 will be described.

FIG. 6 is a flowchart schematically showing one example of control routine executed by the parent node 10.

The control routine illustrated in the flowchart is repeatedly executed when the parent node 10 is in a waking state (power ON state).

In step S102, the parent node 10 holds the routing table on the main memory (RAM).

In step S104, the parent node 10 starts measuring time with a fixed cycle timer based on a predetermined cycle.

In step S106, the parent node 10 (NW failure range specifying unit 121) checks the presence or absence of a communication disruption notice from the child nodes 20-1, 20-2.

In step S108, the parent node 10 (NW failure range specifying unit 121) determines whether it has received a communication disruption notice from the child nodes 20-1, 20-2. If the parent node 10 (NW failure range specifying unit 121) has received the communication disruption notice, the control proceeds to step S110. If not, the control proceeds to step S116.

In step S110, the parent node 10 (NW failure scope specifying unit 121) specifies the range of communication disruption, based on the routing table.

In step S112, the parent node 10 (NW reconstruction unit 122) reconstructs the network. Namely, the parent node 10 (NW reconstruction unit 122) determines an alternate network for restoring communications with the child node 20 that is in the communication disruption condition, and updates the routing table to the content according to the alternate network. The parent node 10 (NW reconstruction unit 122) also creates the MAC address tables of the child nodes 20-1 to 20-6 (switches 21-1 to 21-6) according to the alternate network.

For example, when a communication disruption notice concerning communication disruption of the connection channel between the child node 20-1 and the child node 20-2 is received, the NW reconstruction unit 122 can specify that communications between the parent node 10 and the child nodes 20-2 to 20-4 are disrupted, based on the routing table (see FIG. 4) associated with the main network, as described above. Therefore, the NW reconstruction unit 122 determines the configuration (see FIG. 2B) of the alternate network in which the connection channel between the child node 20-5 and the child node 20-4 is set to the active state, as described above, and updates route information from the parent node 10 to the child nodes 20-2 to 20-4 in the routing table, as shown in FIG. 7. Also, the NW reconstruction unit 122 creates the MAC address table of the parent node 10, and the child nodes 20-1 to 20-6 according to the configuration of the alternate network, as shown in FIG. 8. More specifically, since the child nodes 20-2 to 20-4 are connected to the child node 20-1 via the child node 20-5, the MAC address table of the child node 20-1 (switch 21-1) is changed, relative to the MAC address table (see FIG. 3) of the main network, such that the child nodes 20-2 to 20-4 are connected to the port P2 of the switch 21-1. Also, the MAC address table of the child node 20-2 (switch 21-2) is changed, relative to the MAC address table according to the configuration of the main network, such that the parent node 10, and the child nodes 20-1, 20-5, and 20-6 are connected to the port P2 of the switch 21-2. Also, the MAC address table of the child node 20-4 (switch 21-4) is changed, relative to the MAC address table according to the configuration of the main network, such that the parent node 10, and the child nodes 20-1, 20-5, and 20-6 are connected to the port P1 of the switch 21-4. Also, the MAC address table of the child node 20-5 (switch 21-5) is changed, relative to the MAC address table according to the main network, such that the child nodes 20-2 to 20-4 are connected to the port P1 of the switch 21-5.

In FIG. 7 and FIG. 8, highlighted portions represent portions changed (updated) from those of FIG. 4 and FIG. 3, respectively.

Referring back to FIG. 6, in step S114, the parent node 10 (delivery unit 123) delivers the NW configuration change notice including the MAC address tables created in step S112, to the child nodes 20-1 to 20-6. As described above, the parent node 10 (delivery unit 123) may deliver the NW configuration change notice to the child nodes 20-1 to 20-6 by broadcasting, or deliver it to the child nodes by unicasting.

In step S116, the parent node 10 determines whether measuring of time with the fixed cycle timer is completed. If measuring of time with the fixed cycle timer has not been completed, the parent node 10 returns to step S106, and repeats the process of steps S106 to S116. If measuring of time with the fixed cycle timer is completed, the current cycle of the routine ends.

Figure 9:
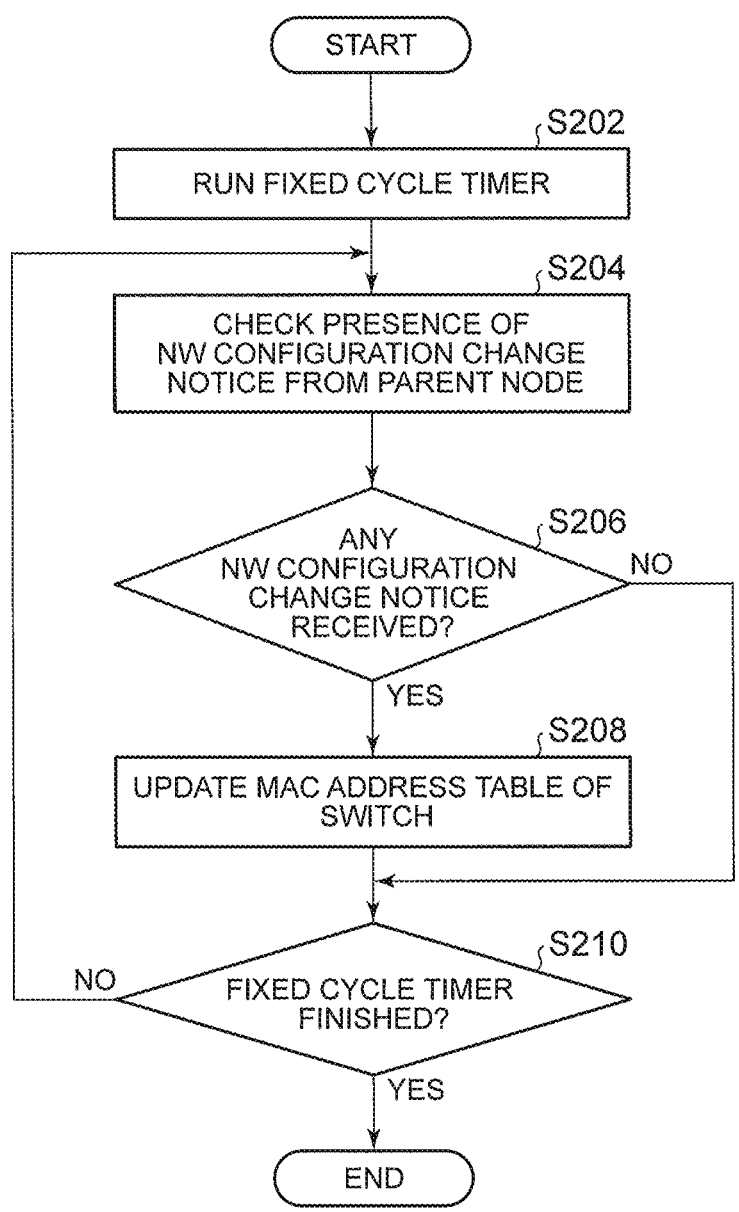
FIG. 9 is a flowchart schematically illustrating one example of control routine executed by childe nodes.

Referring next to FIG. 9, a control flow or routine executed by the child node 20 (child nodes 20-1 to 20-6) will be described.

FIG. 9 illustrates the control routine executed by the child node 20 (childe nodes 20-1 to 20-6). The routine of this flowchart is repeatedly executed when the child node 20 (child nodes 20-1 to 20-6) is in a waking state (power ON state), for example.

In step S202, the child node 20 starts measuring time with a fixed cycle timer based on a predetermined cycle.

In step S204, the child node 20 checks the presence or absence of a NW configuration change notice received from the parent node 10.

In step S206, the child node 20 determines whether it has received the NW configuration change notice from the parent node 10. For example, the child node 20 can determine whether the received Ethernet frame is the NW configuration change notice, by checking the frame type 513 (see FIG. 5B, FIG. 5C) of the Ethernet frame concerning the NW configuration change notice, as described above. If the NW configuration change notice is received from the parent node 10, the child node 20 proceeds to step S208. If not, the child node 20 proceeds to step S210.

In step S208, the child node 20 updates the MAC address table of the switch 21, using the content of the MAC address table included in the NW configuration change notice.

When the NW configuration change notice is delivered by broadcasting, the child node 20 can retrieve the MAC address table corresponding to the switch 21 of the own node, from the Ethernet frame concerning the NW configuration change notice, by checking the above-described switch ID 523.

In step S210, the child node 20 determines whether measuring of time with the fixed cycle timer is completed. If measuring of time with the fixed cycle timer has not been completed, the child node 20 returns to step S204, and repeats steps S204 to S210. If measuring of time with the fixed cycle timer is completed, the current cycle of this routine ends.

Thus, in this embodiment, the communication disruption detecting units 221 (221-1, 222-2) are provided on the logical tree-type main network, for detecting disruption (communication failure) of communications via a communication line 25 included in the main network, among the plurality of communication lines 25 that physically connect the plurality of loop nodes (child nodes 20-1, 20-2, 20-4, 20-5) to a loop. More specifically, the communication disruption detecting units 221-1, 221-2 are provided in the loop nodes (i.e., the child nodes 20-1, 20-2) that are at the upper hierarchical level than the logically terminal loop nodes, among the loop nodes. Therefore, disruption of communications via the communication line 25 included in the main network, among the plurality of communication lines 25 that physically connect the loop nodes to a loop, can be detected from the upper-level nodes (closer to the parent node 10 on the main network) in the main network. In this manner, the parent node 10 can obtain the communication disruption information.

When disruption of communications via a plurality of communication lines 25 that physically connect a plurality of loop nodes to a loop takes place, the parent node 10 (network reconstruction unit 122) reconstructs a logical tree-type alternate network, which includes a communication line 25 that is not included in the configuration of the main network, namely, is logically blocked in the configuration of the main network, among the plurality of communication lines 25 that physically connect the loop nodes to a loop. Then, the parent node 10 (delivery unit 123) delivers information (MAC address table) concerning the configuration of the reconstructed alternate network, to the child nodes 20-1 to 20-6. Accordingly, the child nodes 20-1 to 20-6 can grasp the configuration of the reconstructed alternate network, and achieve restoration or recovery of communications, by receiving the information concerning the configuration of the alternate network delivered from the parent node 10. Therefore, a large number of signals are prevented from being transmitted and received between the respective nodes connected to the network, as in the case where ARP is used, and a large number of signals are prevented from being transmitted by broadcasting, to increase the network load; therefore, restoration of communications can be achieved at an earlier opportunity. Also, since the processing associated with reconfiguration of the network is centralized in the parent node 10, restoration of communications can be achieved at an earlier opportunity.

While the function of the communication disruption detecting unit 221 is provided in the child nodes 20-1, 20-2 in this embodiment, it may be provided in the parent node 10 instead. In this case, the parent node 10 sends a response request, or the like, to the child nodes 20-1, 20-2, 20-4, 20-5 physically connected to a loop, and monitors the presence or absence of any reply, for example. Thus, the parent node 10 can detect communication disruption of a communication line 25 included in the configuration of the main network, among the communication lines 25 that physically connect the child nodes 20-1, 20-2, 20-4, 20-5 to a loop. While the plurality of child nodes 20 are physically connected to a loop in this embodiment, a plurality of nodes including the parent node 10 may be connected to a loop. While the delivery unit 123 delivers the MAC address tables to the child nodes 20, as information concerning the configuration of the network (alternate network), the delivery unit 123 may deliver the routing table, for example. In this case, when each of the child nodes 20-1 to 20-6 receives the routing table delivered from the parent node 10, the child node updates the MAC address table of a corresponding one of the switches 21-1 to 21-6, based on the content of the routing table.

Figure 10:
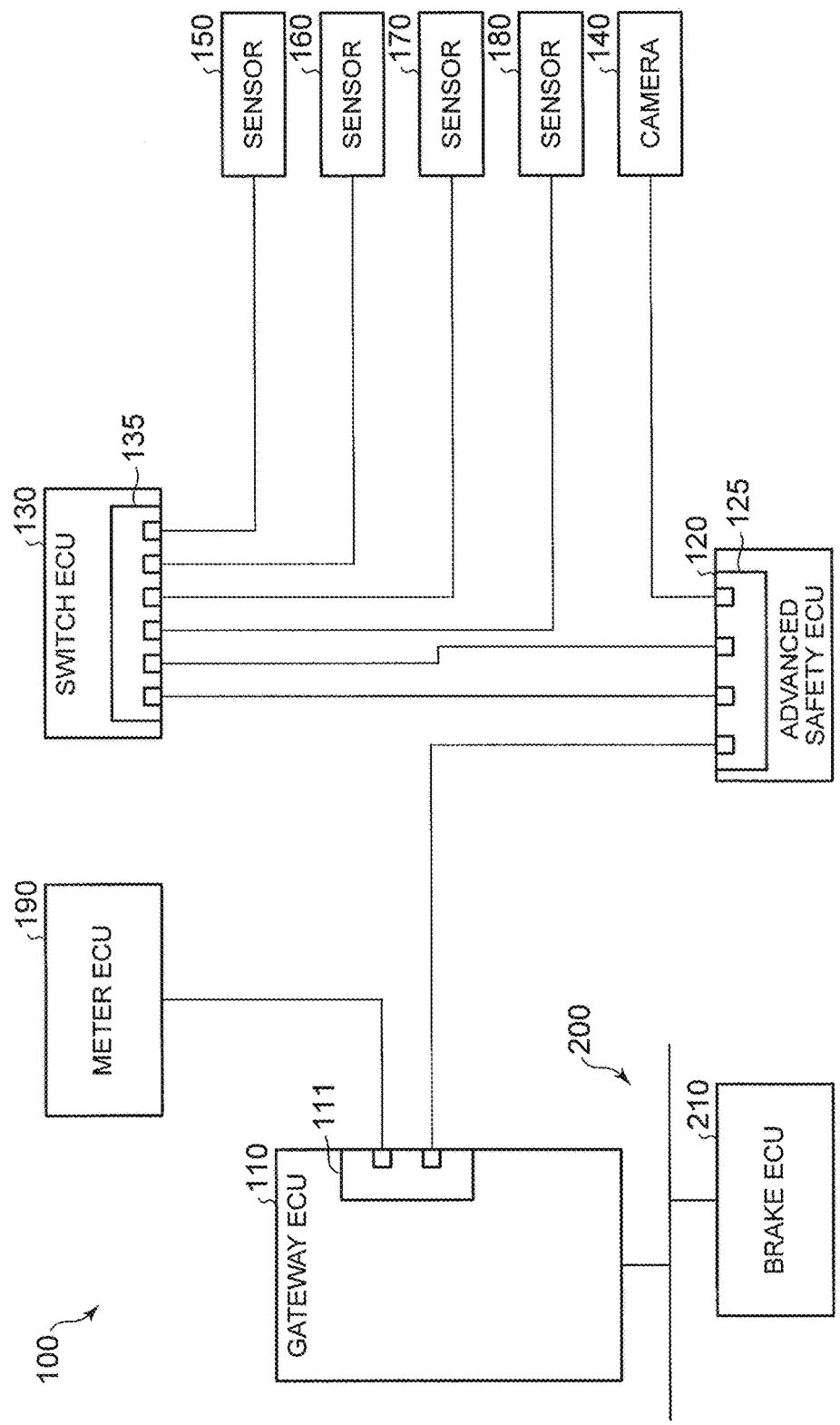
FIG. 10 is a view showing a specific example of the on-board network system according to the first embodiment.

Referring next to FIG. 10, a specific example in which each node (each of the parent node 10 and the child nodes 20) of the on-board network system 1 is applied to a specific node (ECU, sensor, etc.) installed on the vehicle will be described.

FIG. 10 shows the specific example (on-board network system 100) of the on-board network system 1.

The on-board network system 100 includes a gateway ECU 110, advanced safety ECU 120, switch ECU 130, camera 140, sensors 150, 160, 170, 180, and a meter ECU 190. Also, the vehicle includes a brake ECU 210 connected to a CAN network 200, as an element related to the on-board network system 100.

The gateway ECU 110 is the top-level node (root node) in the on-board network system 100, and corresponds to the parent node 10. The gateway ECU 110 includes a switch 111, and is connected with the advanced safety ECU 120 and the meter ECU 190, via communication lines connected to respective ports of the switch 111. For example, the switch 111 transfers an Ethernet frame concerning an alarm request transmitted from the advanced safety ECU 120, to the meter ECU 190, based on the destination MAC address.

The gateway ECU 110 is connected to both the on-board network system 100 based on the Ethernet communication protocol, and the CAN network 200 based on the CAN communication protocol, and has a function of relaying communications between the on-board network system 100 and the CAN network 200. For example, the gateway ECU 110 transfers an automatic brake request transmitted from the advanced safety ECU 120, to the brake ECU 210.

The advanced safety ECU 120 is an intermediate node in the on-board network system 100. The advanced safety ECU 120 includes a switch 125, and is connected to the gateway ECU 110, switch ECU 130, and the camera 140, via communication lines connected to respective ports of the switch 125. In particular, the switch 125 and the switch ECU 130 (a switch 135 which will be described later) are physically redundantly connected (connected to a loop), and two ports of the switch 125 are respectively connected with two ports of the switch 135 via communication lines. The advance safety ECU 120 is a loop node at the upper hierarchical level than a terminal loop node (switch ECU 130) as seen from the gateway ECU 100, among a plurality of loop nodes physically connected to a loop, and corresponds to the child node 20-1, 20-2. For example, the advanced safety ECU 120 determines the possibility of collision with an obstacle around the vehicle, based on a captured image received from the camera 140, and range images received from the sensors 150, 160, 170, 180 via the switch ECU 130. Then, if the possibility of collision becomes relatively high, and exceeds a first criterion, the advanced safety ECU 120 sends an Ethernet frame concerning an alarm request for the meter ECU 190, from the switch 125 to the gateway ECU 110. Also, if the possibility of collision becomes considerably high, and exceeds a second criterion that is higher than the first criterion, the advanced safety ECU 120 sends an Ethernet frame concerning an automatic brake request for the brake ECU 210, from the switch 125 to the gateway ECU 110.

The switch ECU 130 is an intermediate node in the on-board network system 100. The switch ECU 130 includes a switch 135, and is connected to the advanced safety ECU 120 and the sensors 150, 160, 170, 180, via communication lines connected to respective ports of the switch 135. In particular, the switch 135 and the advanced safety ECU 120 (switch 125) are physically redundantly connected (connected to a loop), as described above. The switch ECU 130 is a terminal loop node as seen from the gateway ECU 100, among a plurality of loop nodes physically connected to a loop, and corresponds to the child nodes 20-4, 20-5. For example, the switch ECU 130 transfers Ethernet frames concerning range images transmitted from the sensors 150, 160, 170, 180, to the advanced safety ECU 120, based on the destination MAC address.

The camera 140 is a terminal node in the on-board network system 100. The camera 140 is connected to the advanced safety ECU 120 (switch 125), via a communication line. For example, the camera 140 captures an image of a given range around the vehicle, at intervals of a given period (e.g., 1/30 sec.), and sends an Ethernet frame concerning the captured image to the advanced safety ECU 120.

The sensors 150, 160, 170, 180 are terminal nodes in the on-board network system 100. The sensors 150, 160, 170, 180 are connected to the switch ECU 130 (switch 135), via communication lines. For example, each of the sensors 150, 160, 170, 180 is a laser radar, a millimeter-wave radar, or the like, which detects the distance from an obstacle in a given range around the vehicle. Each of the sensors 150, 160, 170, 180 sends an Ethernet frame concerning a range image corresponding to the distance from the obstacle detected in the given range, which frame designates the advanced safety ECU 120 as a destination, to the switch ECU 130.

The meter ECU 190 is a terminal node in the on-board network system 100. The meter ECU 190 is connected to the gateway ECU 110 (switch 111), via a communication line. For example, if the meter ECU 190 receives an alarm request from the advanced safety ECU 120, which request is transferred from the gateway ECU 110, the meter ECU 190 displays a warning indicating a relatively high possibility of collision, on a meter in the vehicle interior, or causes a speaker to generate a warning tone or sound. It is thus possible to urge the driver to perform operation (braking operation) for avoiding collision with the obstacle.

The brake ECU 210 is an electronic control unit that performs operation control of a brake system of the vehicle. For example, if the brake ECU 210 receives an automatic brake request from the advanced safety ECU 120, which request is transmitted from the gateway ECU 110 to the CAN network 200, the brake ECU 210 actuates the brake system, and causes the brake system to automatically generate braking force in the vehicle, irrespective of operation by the driver. Thus, in a situation where the possibility of collision with an obstacle is considerably high, it is possible to automatically actuate the brake system, so as to avoid collision with the obstacle.

In the on-board network system 100, one of the two connection channels (communication lines) that connect the advanced safety ECU 120 (switch 125) with the switch ECU 130 (switch 135) is normally set to an active state, and the other connection channel is set to a blocked state.

If disconnection, or the like, occurs to the connection channel set in the active state, the advanced safety ECU 120 (a functional unit corresponding to the communication disruption detecting unit 221 and the notifying unit 222) detects disruption of communications with the switch ECU 130, and sends a communication disruption notice concerning the communication disruption to the gateway ECU 110. The gateway ECU 110 (a functional unit corresponding to the NW reconstruction unit 122) determines an alternate network in which the connection channel set in the blocked state is set to the active state, and creates a MAC address table corresponding to the alternate network. Then, the gateway ECU 110 (a functional unit corresponding to the delivery unit 123) delivers a NW configuration change notice including the created MAC address table, to the advanced safety ECU 120, switch ECU 130, camera 140, sensors 150, 160, 170, 180, and the meter ECU 190. Thus, the advanced safety ECU 120, switch ECU 130, camera 140, sensors 150, 160, 170, 180, and the meter ECU 190 update the MAC address table, based on the NW configuration change notice, and can recover from the network failure.

In the vehicle control system like this example, in particular, in the system for avoiding collision with obstacles, it is necessary to restore communications in real time, in response to a network failure. More specifically, when the vehicle is traveling on an express highway at 100 km/h, the vehicle moves about 30 m per second. In this situation, where the braking distance of a forward vehicle due to sudden braking is about 60 m, and the distance from the forward vehicle is about 50 m to 100 m, it is necessary to restore communications within about one second, so as to surely generate a warning to the driver or apply an automatic brake, in response to the sudden braking of the forward vehicle. On the other hand, in the on-board network system 100 according to this embodiment, occurrence of a network failure does not result in a situation where time is wastefully consumed due to sending and receiving of signals between respective nodes, and a situation where a communication load becomes considerably high due to broadcasting of signals. Further, the processing involving reconstruction of the network is centralized at the root node (gateway ECU 110). Therefore, the time it takes until restoration of communications can be significantly shortened, and the communication restoration can be achieved in real time (for example, within one second).

Second Embodiment

Next, a second embodiment will be described.

An on-board network system 2 according to this embodiment includes a plurality of gateway devices 30, as a plurality of nodes that are physically connected such that each pair of the nodes are connected by a single communication line, and these nodes can communicate with each other, as will be described later. The gateway devices 30 belong to a plurality of local networks LN1-LN3, respectively, and are operable to relay communications among the local networks LN1 to LN3. In the on-board network system 2, a logical network is constructed by use of only one communication route determined from two or more communication routes between two gateway devices 30 among the plurality of gateway devices 30, and communications between the gateway devices 30 are conducted based on information concerning the configuration of the network.

Figure 11:
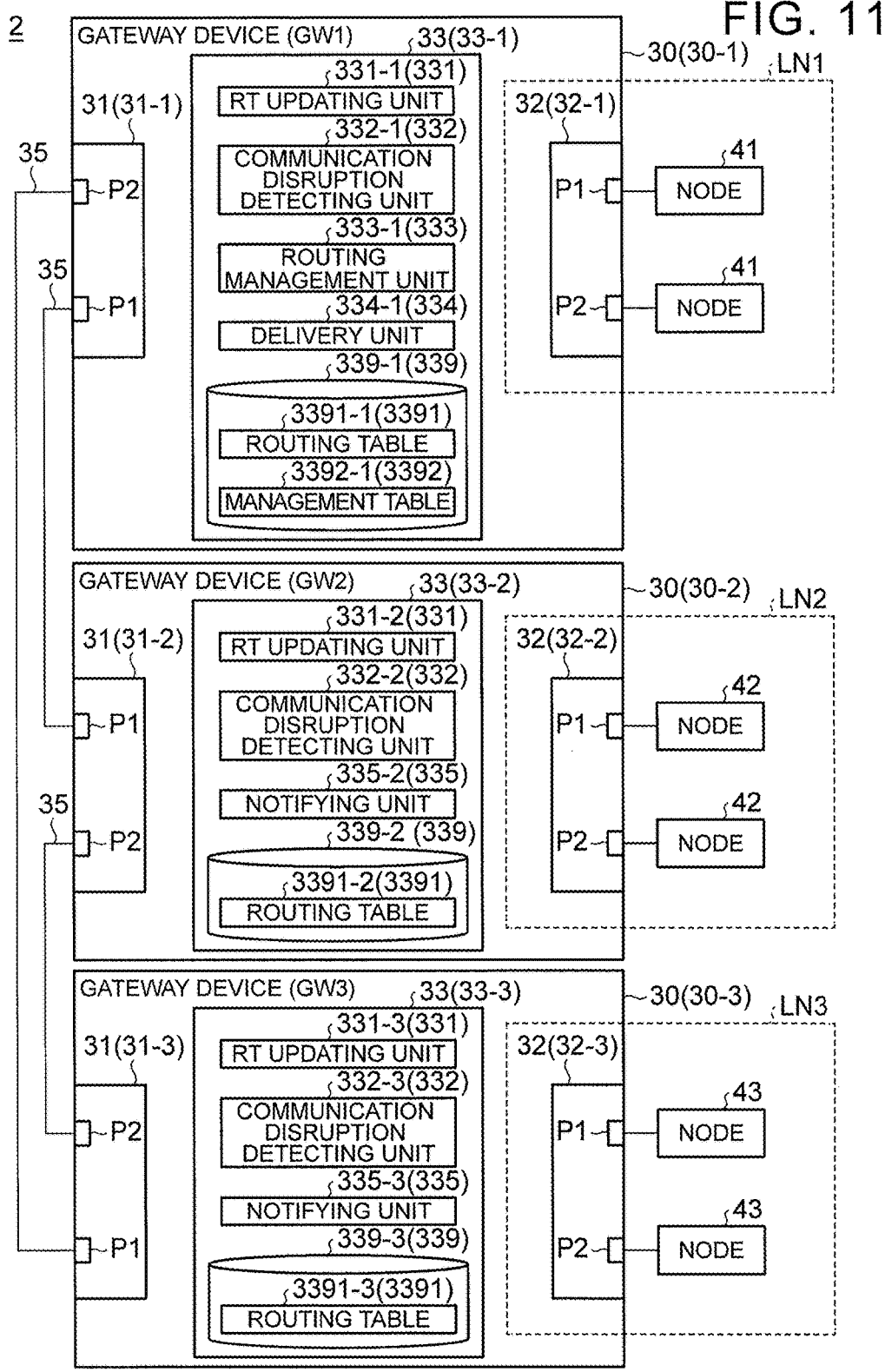
FIG. 11 is a configuration diagram schematically showing one example of the configuration of an on-board network system according to a second embodiment.

Referring initially to FIG. 11, the configuration of the on-board network system 2 according to this embodiment will be described. The on-board network system 2 includes the gateway devices 30, more specifically, gateway devices 30-1 to 30-3 that belong to the local networks LN1 to LN3, respectively. The on-board network system 2 also includes nodes 41 to 43 connected to the gateway devices 30-1 to 30-3, respectively, as constituent elements that belong to the local networks LN1 to LN3, respectively.

The on-board network system 2 will be described in terms of a physical network. The plurality of (three in this embodiment) gateway devices 30 are connected with each other via communication lines 35, so as to be physically connected to a loop. Therefore, when a local network to which each gateway device 30 belongs communicates with another local network, a plurality of (two) communication routes can be employed.

On the other hand, where the on-board network system 2 is described in terms of a logical network, a logical main network (first network) is constructed, such that certain two gateway devices 30 can communicate with each other via only one communication route, among a plurality of physical communication routes between the two gateway devices 30. More specifically, the logical main network is constructed by use of a communication route of which the pre-specified priority is the highest, among a plurality of physical communication routes between certain two gateway devices 30. Referring next to FIG. 12, the logical network configuration in the on-board network system 1 will be described.

FIG. 12 shows communication routes between two of the gateway devices 30-1 to 30-3 in the on-board network system 2. More specifically, FIG. 12 shows table information indicating physical communication routes between two gateway devices 30, and the priority of each communication route, and corresponds to a management table 3392 (3392-1) which will be described later.

In FIG. 12, the gateway devices 30-1 to 30-3 are denoted as GW1 to GW3, respectively, and the nodes 41 to 43 are denoted as node 1 to node 3, respectively. This notation also applies to FIG. 13, etc. While a communication route between two gateway devices 30 is represented by a communication route from one of the two gateway devices 30 to the other in FIG. 12, a communication route from the other to the one is obtained by reversing the above communication route, and therefore, is not shown in FIG. 12. Also, "P1" or "P2" in parentheses in the column of "ROUTE" in FIG. 12 indicates the port number of an L3 switch 31 that will be described later.

As shown in FIG. 12, two communication routes exist between the gateway device 30-1 (node 41) that belongs to the local network LN1 and the gateway device 30-2 (node 42) that belongs to the local network LN2. One of the two communication routes is through a communication line 35 that directly connects the gateway device 30-1 with the gateway device 30-2. The other communication route goes through the gateway device 30-3 located adjacent to each of the gateway devices 30-1, 30-2.

Similarly, two communication routes exist between the gateway device 30-1 (node 41) that belongs to the local network LN1 and the gateway device 30-3 (node 43) that belongs to the local network LN3. One of the two communication routes is through a communication line 35 that directly connects the gateway device 30-1 with the gateway device 30-3. The other communication route goes through the gateway device 30-2 located adjacent to each of the gateway devices 30-1, 30-3.

Similarly, two communication routes exist between the gateway device 30-2 (node 42) that belongs to the local network LN2 and the gateway device 30-3 (node 43) that belongs to the local network LN3. One of the two communication routes is through a communication line 35 that directly connects the gateway device 30-2 with the gateway device 30-3. The other communication route goes through the gateway device 30-1 located adjacent to each of the gateway devices 30-2, 30-3.

As described above, the priority is specified in advance, for the two communication routes that physically connect two gateway devices 30. In this embodiment, the priority "1" (the highest priority) is specified for a communication route through a communication line 35 that directly connects two gateway devices 30, namely, a communication route having the least number of hops, and the priority "2" (the lowest priority) is specified for a communication route going through another adjacent gateway device 30, namely, a communication route having the largest number of hops. In the on-board network system 2, since the logical main network is constituted by the communication routes having the highest priority, as described above, communications between two gateway devices 30 are normally conducted, via the communication route through the communication line 35 that directly connects the two gateway devices 30.

If a communication failure (communication disruption), such as disconnection, occurs to any of the communication lines 35 that connect two of the gateway devices 30-1 to 30-3 with each other, communications via the communication line 35 that causes the communication disruption cannot be performed. Therefore, in the on-board network system 2, if communication disruption occurs to any of the communication lines 35 that physically connect the gateway devices 30-1 to 30-3 to a loop, a logical alternate network (second network) is constructed, by use of a communication route having the highest priority, among the communication routes that do not include the communication line 35 that causes the communication disruption. For example, if communication disruption occurs to the communication line 35 that physically directly connects the gateway device 30-2 with the gateway device 30-3, a logical alternate network is constructed by changing the communication route between the gateway device 30-2 and the gateway device 30-3, to a communication route that does not go through the communication line 35 that physically directly connects the gateway devices 30-2, 30-3, namely, a communication route (highlighted portion in FIG. 12) that goes through the gateway device 30-1. The processing performed when communication disruption occurs to any of the communication lines 35 is intensively carried out in the gateway device 30-1, among the gateway devices 30-1 to 30-3, as will be described later.

Thus, in the on-board network system 2, communications are performed through a logically selected one communication route, among a plurality of (two) communication routes between certain two gateway devices 30. Thus, each of the gateway devices 30 has route information corresponding to the above-indicated communication route, namely, a routing table 3391 (more specifically, routing tables 3391-1 to 3391-3 corresponding to the gateway devices 30-1 to 30-3, respectively) which will be described later. Referring next to FIG. 13 and FIG. 14, the routing table 3391 will be described.

FIG. 13 shows the routing table 3391 concerning the main network. FIG. 14 shows the routing table 3391 concerning the alternate network, more specifically, the routing table 3391 concerning the alternate network in the case where communication disruption occurs to the communication line 35 that directly connects the gateway devices 30-2, 30-3.

In FIG. 13 and FIG. 14, respective routing tables 3391 (routing tables 3391-1 to 3391-3) of the gateway devices 30-1 to 30-3 are indicated in one table, for the sake of convenience. In FIG. 13 and FIG. 14, "RELAY POINT" indicates the gateway device 30 to which a communication packet is relayed next, among the other gateway devices 30 physically directly connected to the gateway device 30 in question via the communication lines 35, and the port number of the L3 switch 31 to which the next relaying gateway device 30 is connected is indicated in parentheses.

As shown in FIG. 13 and FIG. 14, the routing table 3391 is table information that associates the address (more specifically, identification information (IP address) indicating the address) of a communication packet, with another gateway device 30 (port number) as a relay point.

As described above, the main network is constructed by the communication route through the communication lines 35 that directly connect two gateway devices 30. Therefore, as shown in FIG. 13, the gateway device 30-1 (L3 switch 31-1 which will be described later) relays communication packets in which identification information (IP addresses) indicated in the addresses corresponds to the nodes 42, 43 (namely, the local networks LN2, LN3), to the gateway devices 30-2, 30-3, respectively. Also, the gateway device 30-2 (L3 switch 31-2 which will be described later) relays communication packets in which identification information (IP addresses) indicated in the addresses corresponds to the nodes 41, 43 (namely, the local networks LN1, LN3), to the gateway devices 30-1, 30-3, respectively. Also, the gateway devices 30-3 (L3 switch 31-3 which will be described later) relays communication packets in which identification information (IP addresses) indicated in the addresses corresponds to the nodes 41, 42 (namely, the local networks LN1, LN2), to the gateway devices 30-1, 30-2, respectively.

On the other hand, in the alternate network, the communication route between the gateway devices 30-2, 30-3 is changed, as described above. Therefore, as shown in FIG. 14, the gateway device 30-2 (L3 switch 31-2) relays a communication packet in which identification information (IP address) indicated in the address corresponds to the node 43 (local network LN3), to the gateway device 30-1, rather than the gateway device 30-3. Also, the gateway device 30-3 (L3 switch 31-3) relays a communication packet in which identification information (IP address) indicated in the address corresponds to the node 42 (local network LN2), to the gateway device 30-1, rather than the gateway device 30-2.

Thus, the gateway devices 30-1 to 30-3 can send and receive communication packets between two of the local networks LN1 to LN3, by use of the routing table 3391 as information concerning the configuration of the logical network.

Referring back to FIG. 11, the gateway device 30 includes the L3 switch 31, L2 switch 32, and a microcomputer 33. The L3 switch 31, L2 switch 32, and microcomputer 33 include L3 switches 31-1 to 31-3, L2 switches 32-1 to 32-3, and microcomputers 33-1 to 33-3, which correspond to the gateway devices 30-1 to 30-3, respectively.

The L3 switch 31 includes two or more plurality of ports P1, P2, and is connected to ports of the L3 switches 31 of the gateway devices 30 other than the gateway device 30 including the L3 switch 31 in question, via communication lines 35 (Ethernet cables) connected to the respective ports. The L3 switch 31 transfers a communication packet received from another gateway device 30, or a communication packet transmitted from the local network (L2 switch 32) to which the gateway device 30 including the L3 switch 31 in question belongs toward another local network, to another local network, based on the routing table 3391 stored in a storage unit 339 (which will be described later) of the microcomputer 33, and the identification information of the address (e.g., the IP address of the node of the address) indicated in the communication packet.

The L3 switch 31-1 is physically connected to the gateway device 30-2 (L3 switch 31-2) via a communication line 35 connected to the port P1, and is physically connected to the gateway device 30-3 (L3 switch 31-3) via a communication line 35 connected to the port P2.

The L3 switch 31-2 is physically connected to the gateway device 30-1 (L3 switch 31-1) via a communication line 35 connected to the port P1, and is physically connected to the gateway device 30-3 (L3 switch 31-3) via a communication line 35 connected to the port P2.

The L3 switch 31-3 is physically connected to the gateway device 30-1 (L3 switch 31-1) via a communication line 35 connected to the port P1, and is physically connected to the gateway device 30-2 (L3 switch 31-2) via a communication line 35 connected to the port P2.

The L2 switch 32 relays communications in the local network to which the gateway device 30 including the L2 switch 32 in question belongs, based on the MAC address table. Also, the L2 switch 32 sends a communication packet (communication frame) transmitted from each node of the local network to another local network, to the L3 switch 31.

The L2 switch 32-1 has two or more ports (ports P1, P2), and the nodes 41 as constituent elements of the local network LN1 are connected to the L2 switch 32-1, via communication lines connected to the respective ports.

The L2 switch 32-2 has two or more ports (ports P1, P2), and the nodes 42 as constituent elements of the local network LN2 are connected to the L2 switch 32-2, via communication lines connected to the respective ports.

The L2 switch 32-3 has two or more ports (ports P1, P2), and the nodes 43 as constituent elements of the local network LN3 are connected to the L2 switch 32-3, via communication lines connected to the respective ports.

The local networks LN1 to LN3 may be configured such that the nodes 41 to 43 are further hierarchically connected via the L2 switches.

The microcomputer 33 includes CPU, RAM, ROM, I/O, etc., and implements various functions by executing various programs stored in the ROM, on the CPU. The microcomputer 33 includes, as functional units common to the gateway devices 30-1 to 30-3, a routing table updating unit (RT updating unit) 331 (331-1 to 331-3), communication disruption detecting unit 332 (332-1 to 332-3), and a storage unit 339 (339-1 to 339-3). The microcomputer 33 (microcomputer 33-1) also includes a routing management unit 333 (333-1), and a delivery unit 334 (334-1), as functional units peculiar to the gateway device 30-1. The microcomputer 33 (microcomputer 33-2, 33-3) also includes a notifying unit 335 (335-2, 335-3), as a functional unit peculiar to the gateway devices 30-2, 30-3.

The functions of the microcomputer 33 may be implemented by any hardware, software, or a combination thereof, in place of the microcomputer 33.

The RT updating unit 331 updates the routing table 3391 stored in the storage unit 339, when communication disruption occurs due to disconnection of a communication line 35, for example.

The RT updating unit 331-1 updates the routing table 3391-1 of the storage unit 339-1, based on data of the routing table corresponding to the alternate network, which data is created by the routing management unit 333-1 which will be described later.

The RT updating units 331-2, 331-3 updates the routing tables 3391-2, 3391-3 of the storage units 339-2, 339-3, based on data of the routing table corresponding to the alternate network, which data is included in a routing table updating notice (RT updating notice) delivered from the gateway device 30-1 (delivery unit 334-1), as will be described later.

The communication disruption detecting unit 332 (332-1 to 332-3) detects communication disruption of a communication line 35 that connects the gateway device 30 including the communication disruption detecting unit 332, with another adjacent gateway device 30. The communication disruption detecting unit 332 may detect communication disruption of both of two communication lines 35 that connect the gateway device 30 including the communication disruption detecting unit 332, with other adjacent gateway devices 30, or may detect communication disruption of one communication line 35, such that each of the communication disruption detecting units 332-1 to 332-3 takes charge of one communication line 35.

The function of the communication disruption detecting unit 332 may be provided only in the gateway device 30-1 (one node). In this case, the gateway device 30-1 can detect communication disruption of any communication line 35, by sending a response request to either of the gateway devices 30-2, 30-3, via each of a plurality of (three) communication lines 35 that physically connect the gateway devices 30-1 to 30-3 to a loop, for example, and monitoring the presence or absence of a reply, for example.

When communication disruption of any of the communication lines 35 is detected by the communication disruption detecting unit 332 (332-1 to 332-3), the routing management unit 333 (333-1) reconstructs an alternate network, and creates information related to the configuration of the alternate network, namely a routing table concerning the alternate network. More specifically, the routing management unit 333-1 creates the routing table concerning the alternate network, based on the management table 3392-1 (see FIG. 12) stored in the storage unit 339-1.

The delivery unit 334 (334-1) delivers the RT updating notice including data of the routing table concerning the alternate network, to the gateway devices 30-2, 30-3, via the L3 switch 31-1.

The RT updating unit 331-1 of the gateway device 30-1 receives the RT updating notice from the routing management unit 333 (333-1). The delivery unit 334 may deliver only the routing table changed from the main network, out of the routing tables corresponding to the gateway devices 30-2, 30-3.

When disruption of communications via a communication line 35 is detected by the communication disruption detecting unit 332-2, 332-3, the notifying unit 335 (335-2, 335-3) sends a communication disruption notice including information concerning the communication line 35 that causes the communication disruption, to the gateway device 30-1, via the corresponding L3 switch 31-2, 31-3.

If the communication disruption detecting unit 332-1 of the gateway device 30-1 detects communication disruption of any communication line 35, the detecting unit 332-1 sends a communication disruption notice to the routing management unit 333.

Figure 15:
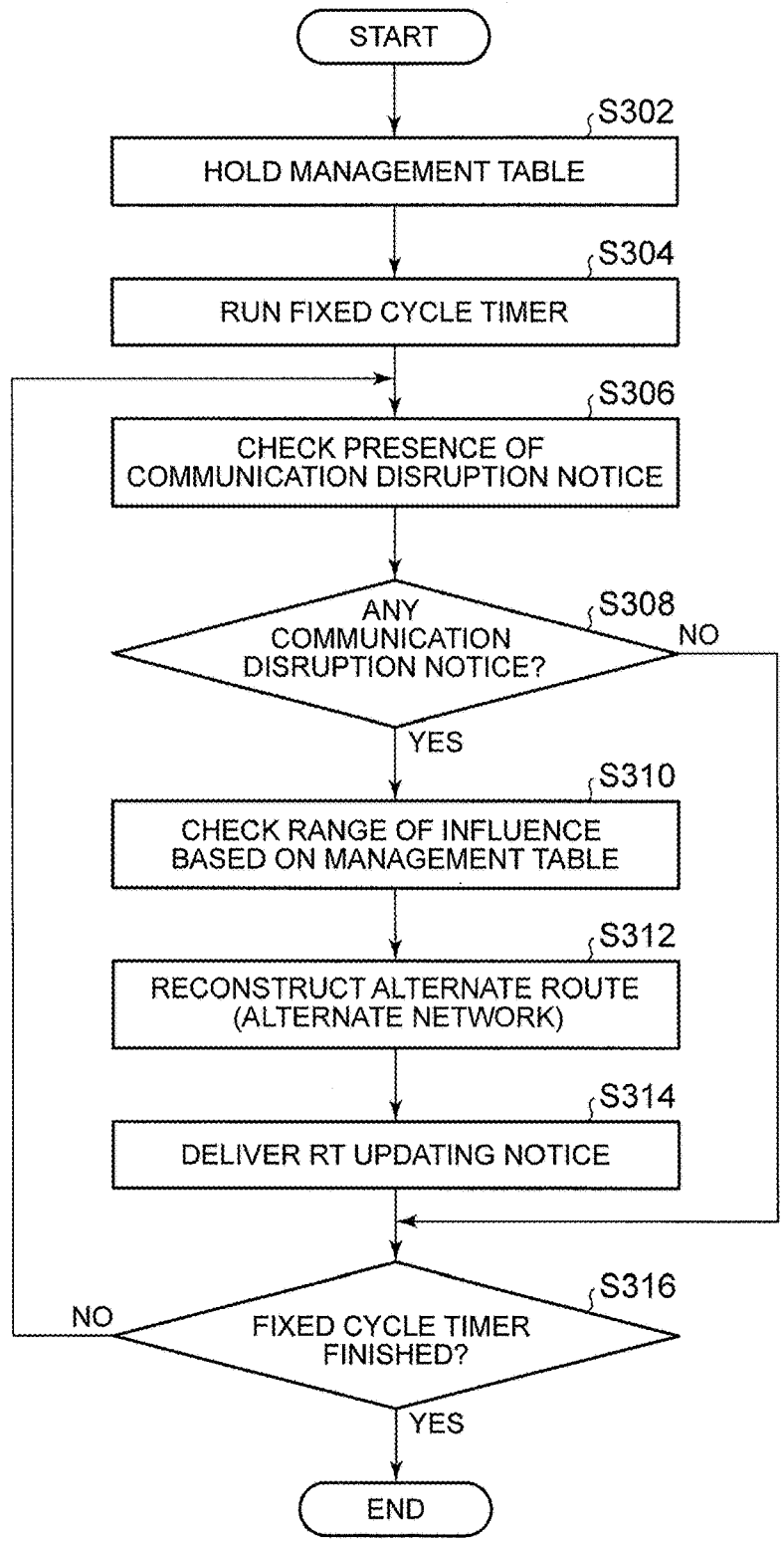
FIG. 15 is a flowchart schematically illustrating one example of control routine executed by a gateway device (routing management unit)

Referring next to FIG. 15, the processing performed by the gateway device 30-1 (routing management unit 333-1, delivery unit 334-1) will be described.

FIG. 15 is a flowchart schematically showing one example of control routine executed by the gateway device 30-1.

The control routine of this flowchart is repeatedly executed when the gateway device 30-1 is in a waking state (power ON state), for example.

In step S302, the gateway device 30-1 (routing management unit 333-1) holds the management table 3392-1 on the main memory (RAM).

In step S304, the gateway device 30-1 (routing management unit 333-1) starts measuring time with a fixed cycle timer based on a given cycle.

In step S306, the gateway device 30-1 (routing management unit 333-1) checks the presence or absence of a communication disruption notice from the communication disruption detecting units 332-1 to 332-3.

In step S308, the gateway device 30-1 (routing management unit 333-1) determines whether any communication disruption notice has been received from the communication disruption detecting units 332-1 to 332-3. If a communication disruption notice is received, the gateway device 30-1 (routing management unit 333-1) proceeds to step S310. If not, the gateway device 30-1 proceeds to step 316.

In step S310, the gateway device 30-1 (routing management unit 333-1) specifies the range of communication failure, based on the management table 3392-1.

In step S312, the gateway device 30-1 (routing management unit 333-1) reconstructs the network. Namely, the gateway device 30-1 (routing management unit 333-1) determines an alternate network for restoring communications in the network that is in the communication disruption state, and creates data of the routing table of the gateway devices 30-1 to 30-3 in connection with the alternate network.

For example, when a communication disruption notice regarding communication disruption of the communication line 35 between the gateway devices 30-2, 30-3 is received, as described above, the routing management unit 333-1 creates data of the routing table shown in FIG. 14, as described above.

In step S314, the gateway device 30-1 (delivery unit 334-1) delivers a RT updating notice including data of the routing table created in step S312, to the gateway devices 30-2, 30-3, via the L3 switch 31-1. Also, the routing management unit 333-1 of the gateway device 30-1 sends the RT updating notice to the RT updating unit 331-1.

In step S316, the gateway device 30-1 (routing management unit 333-1) determines whether measurement of time with the fixed cycle timer is completed. If measurement of time with the fixed cycle timer is not competed, the gateway device 30-1 returns to step S306, and repeats the process of steps S306 to S316. If measurement of time with the fixed cycle time is completed, the current cycle of the routine ends.

Figure 16:
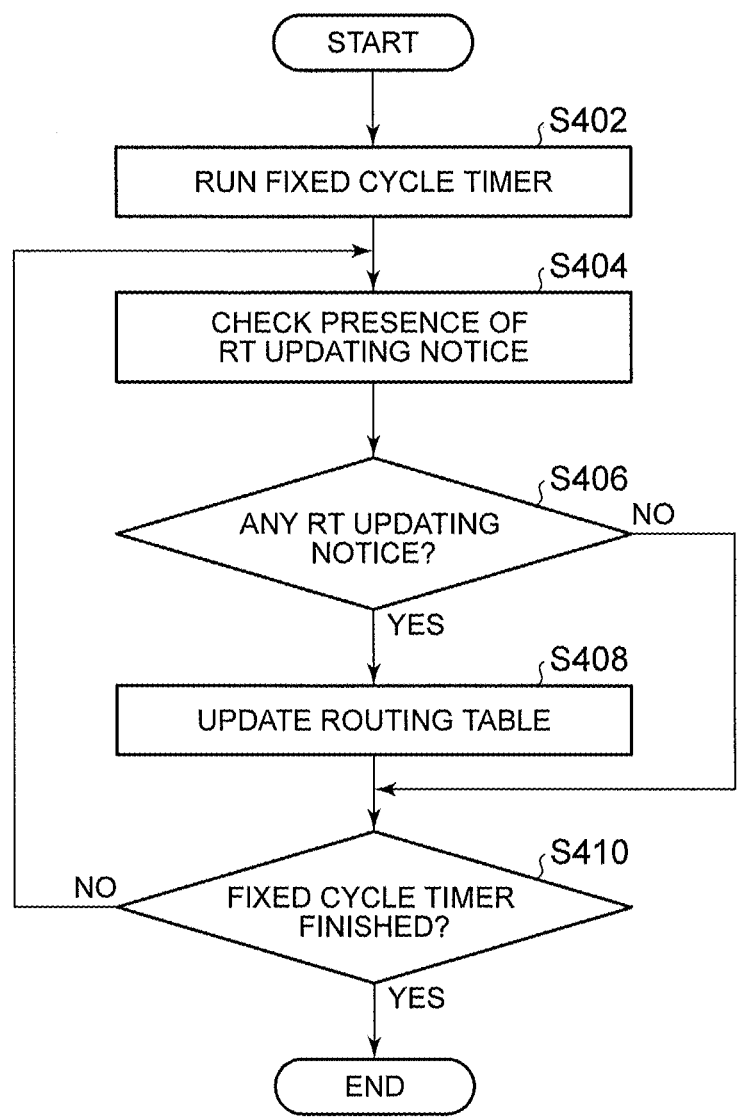
FIG. 16 is a flowchart schematically illustrating one example of control routine executed by the gateway device (routing table updating unit).

Referring next to FIG. 16, control flow performed by the gateway devices 30-1 to 30-3 (RT updating units 331-1 to 331-3) will be described.

FIG. 16 is a flowchart schematically showing one example of control routine executed by each of the gateway devices 30-1 to 30-3 (RT updating units 331-1 to 331-3). The control routine of this flowchart is repeatedly executed when the gateway device 30-1 to 30-3 is in a waking state (power ON state).

In step S402, the gateway device 30-1 to 30-3 starts measuring time with a fixed cycle timer based on a given cycle.

In step S404, the gateway device 30-1 to 30-3 (RT updating unit 331-1 to 331-3) checks the presence or absence of an RT updating notice from the routing management unit 333-1 or the gateway device 30-1.

In step S406, the gateway device 30-1 to 30-3 determines whether any RT updating notice has been received from the routing management unit 333-1 or the gateway device 30-1. If the RT updating notice is received from the routing management unit 333-1 or the gateway device 30-1, the gateway device 30-1 to 30-3 proceeds to step S408.

If not, the gateway device 30-1 to 30-3 proceeds to step S410.

In step S408, the gateway device 30-1 to 30-3 (RT updating unit 331-1 to 331-1) updates the routing table 3391-1 to 3391-3 stored in the storage unit 339-1 to 339-3, using data of the routing table concerning the alternate network included in the RT updating notice.

In step S410, the gateway device 30-1 to 30-3 determines whether measurement of time with the fixed cycle timer is completed. If the measurement of time with the fixed cycle timer has not been completed, the gateway device 30-1 to 30-3 returns to step S404, and repeats the process of steps S404 to S410. If measurement of time with the fixed cycle timer is completed, the current cycle of the routine ends.

Thus, in this embodiment, if disruption of communications via a plurality of communication lines 35 that physically connect a plurality of loop nodes is detected, in the logical main network (first network), one node (the routing management unit 333-1 of the gateway device 30-1) among a plurality of nodes (gateway devices 30-1 to 30-3) reconstructs a logical alternate network (second network) in which the nodes are connected with each other only through one route, which does not go through the communication line 35 that causes the disruption, and creates information (data of the routing table) concerning the configuration of the alternate network. Then, one node (the delivery unit 334-1 of the gateway device 30-1) delivers the created information concerning the configuration of the alternate network, to other nodes (gateway devices 30-2, 30-3) other than the above-indicated one node. Accordingly, the plurality of nodes other than the above one node are able to grasp the configuration of the reconstructed alternate network, and achieve restoration of communications, by receiving the information regarding the configuration of the alternate network delivered from the one node. Therefore, signals are prevented from being transmitted and received between respective gateway devices of an IP network that connects two or more local networks, as in the case where RIP is used, and the network load is prevented from being increased. Thus, restoration of communications can be achieved at an earlier opportunity.

In this embodiment, when there are two or more physical communication routes between two gateway devices 30 among a plurality of gateway devices 30, the priority is specified in advance for each communication route. Therefore, when communication disruption is detected, a communication route that does not include the communication line 35 that causes the communication disruption is selected in order of priority, and a logical alternate network can be easily reconstructed.

While all of the gateway devices that connect two or more local networks are physically connected to a loop by communication lines in this embodiment, a part of the gateway devices may be physically connected to a loop, and the remaining gateway device(s) 30 may be connected so as to branch off from any of the gateway devices 30 physically connected to a loop. In this case, the function of the gateway device 30-1 in this embodiment may be provided in the gateway devices 30 physically connected to a loop, or may be provided in the gateway device(s) 30 other than the gateway devices 30 physically connected to a loop.

While the embodiments of the disclosure have been described in detail, it is to be understood that the disclosure is not limited to the particular embodiments, but may be embodied with various modifications or changes, within the range of the principle of the disclosure described in the appended claims.

What is claimed is:

1. An on-board network system, comprising:
   a plurality of communication lines;
   a plurality of nodes, each of the nodes being directly and physically connected to at least one of the other nodes by at least one of the plurality of communication lines, the plurality of nodes including a plurality of loop nodes physically connected to a loop by the plurality of communication lines, the plurality of nodes constituting a first logical network in which the nodes are connected with each other via one route through the communication lines, the plurality of nodes being configured to communicate with each other based on information concerning the configuration of the first logical network;

a communication disruption detecting unit provided in a first node among the plurality of nodes, or in the plurality of loop nodes, and configured to detect disruption of communications via the communication lines that physically connect the plurality of loop nodes to the loop;

a network reconstruction unit provided in the first node, and configured to reconstruct a second logical network, and create information concerning the configuration of the second logical network, when the disruption of communications is detected by the communication disruption detecting unit, the second logical network being configured such that the nodes are connected with each other via one route through the communication lines, without going through a communication line that causes the disruption; and a delivery unit provided in the first node, and configured to deliver the information concerning the configuration of the second logical network, which is created by the network reconstruction unit, to the plurality of nodes other than the first node, wherein the plurality of nodes comprise a plurality of gateway devices each of which belongs to one of a plurality of local networks, the plurality of gateway devices being configured to relay communications between the plurality of local networks, wherein a degree of priority is specified in advance for a plurality of physical communication routes between each pair of gateway devices among the plurality of gateway devices, and the first logical network is logically constituted by communication routes having the highest priority; and the network reconstruction unit is configured to reconstruct the second logical network, by replacing a first communication route including the communication line that causes the disruption of communications, in the first logical network, with a second communication route having the highest priority, among the plurality of communication routes that do not include the communication line that causes the disruption of communications.

2. The on-board network system according to claim 1, wherein:

the plurality of nodes include a parent node as the first node, and a plurality of child nodes physically connected by the communication lines in a hierarchical fashion, using the parent node as a source node;

the plurality of nodes constitute a logical tree-type network as the first logical network;

the plurality of nodes are configured to communicate with each other based on information concerning the configuration of the first logical network;

the communication disruption detecting unit is provided in a loop node at a higher level of hierarchy than a logically terminal loop node as seen from the parent node, among the plurality of loop nodes, or in the parent node, and is configured to detect disruption of a communication via a first communication line included in the configuration of the first logical network, among the plurality of communication lines that physically connect the plurality of loop nodes to the loop;

the network reconstruction unit is provided in the parent node, the network reconstruction unit being configured to reconstruct the second logical network in a form of a logical tree-type network including a second communication line that is not included in the configuration of the first logical network, the second communication line being among the plurality of communication lines that physically connect the plurality of loop nodes to the loop, and to create information concerning a configuration of the second logical network, when the disruption of communications is detected by the communication disruption detecting unit; and the delivery unit is provided in the parent node, and is configured to deliver the information concerning the configuration of the second logical network, which is created by the network reconstruction unit, to the plurality of childe nodes.

3. The on-board network system according to claim 2, wherein the parent node is a gateway device that relays communications with an external network.

4. The on-board network system according to claim 2, wherein the network reconstruction unit is configured to create route information indicating a route from the parent node to each of the plurality of child nodes, or destination information indicating a port of each of the plurality of child nodes to which each of the other nodes is connected as seen from said each of the plurality of child nodes.

5. The on-board network system according to claim 2, wherein the delivery unit is configured to deliver the information concerning the configuration of the second logical network created by the network reconstruction unit, to the plurality of child nodes, by broadcasting.

6. The on-board network system according to claim 2, wherein the delivery unit is configured to deliver the information concerning the configuration of the second logical network created by the network reconstruction unit, to the plurality of child nodes, by unicasting.

* * * * *